US007684620B2

(12) United States Patent
Megawa

(10) Patent No.: US 7,684,620 B2
(45) Date of Patent: Mar. 23, 2010

(54) IMAGE PROCESSING APPARATUS AND METHOD FOR DIVIDING AN IMAGE INTO COMPONENT IMAGES

(75) Inventor: Shunichi Megawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1037 days.

(21) Appl. No.: 11/384,419

(22) Filed: Mar. 21, 2006

(65) Prior Publication Data
US 2006/0215910 A1 Sep. 28, 2006

(30) Foreign Application Priority Data
Mar. 22, 2005 (JP) ............... 2005-082641

(51) Int. Cl.
*G06K 9/34* (2006.01)
*G06F 15/00* (2006.01)
*G06K 9/00* (2006.01)
(52) U.S. Cl. ...................... 382/176; 358/1.13
(58) Field of Classification Search ..... 358/1.12–1.115, 358/1.5, 407, 438, 468, 501; 382/173, 176; 715/201, 209, 513; 707/1, 3, E17.124, E17.094; 235/487, 494
See application file for complete search history.

(56) References Cited

U.S. PATENT DOCUMENTS

| 6,205,456 B1 * | 3/2001 | Nakao ..................... 715/201 |
| 6,665,081 B1 * | 12/2003 | Suzuki et al. ............. 358/1.13 |
| 7,240,281 B2 * | 7/2007 | Gomi et al. ................. 715/209 |
| 7,359,202 B2 * | 4/2008 | Wakabayashi et al. ...... 361/714 |
| 7,481,374 B2 * | 1/2009 | Walker et al. ............... 235/494 |
| 2006/0215910 A1 * | 9/2006 | Megawa ..................... 382/176 |

FOREIGN PATENT DOCUMENTS

| JP | 05-233872 A | 9/1993 |
| JP | 09-223240 A | 8/1997 |
| JP | 2001-076095 A | 3/2001 |
| JP | 2002-215380 A | 8/2002 |
| JP | 2003-087562 A | 3/2003 |

* cited by examiner

*Primary Examiner*—Amir Alavi
(74) *Attorney, Agent, or Firm*—Foley & Lardner LLP

(57) ABSTRACT

The image particulars of a document image or a part thereof are analyzed and the image particulars of the image are determined according to the outcome of the analysis. Then, the analyzed image particulars of the image are converted to the determined image particulars. Additionally, the analyzed image is divided into component images contained in the image. The image particulars of the image are converted as a result of these processes so that information of the component images for making them as objects of easy viewing with an appropriate data size are output.

20 Claims, 30 Drawing Sheets

| ATTRIBUTES OF REGIONS | IMAGE PARTICULARS |
|---|---|
| CHARACTER | • COLOR DEPTH: 1 BIT (BINARY VALUE)<br>• RESOLUTION: 300dpi<br>• COMPRESSION SYSTEM: MMR |
| PHOTOGRAPH | • COLOR DEPTH: 24ビット<br>• RESOLUTION: 150dpi<br>• COMPRESSION SYSTEM: JPEG |

Fig. 6

| NUMBER OF ASSIGNED PAGES | RESOLUTION (dpi) |
|---|---|
| 1 | 200 |
| 2 | 283 |
| 3 | 346 |
| 4 | 400 |
| 8 | 567 |

□ CHARACTER REGION
(MINIMUM VALUE OF CHARACTER SIZE  Smin)

▨ PHOTOGRAPH REGION
(AREA Sp)

Fig. 13

Table 13A

| RATIO OF NUMBER OF COLOR PIXELS Nc TO TOTAL NUMBER OF PIXELS OF ORIGINAL N | COLOR MODE |
|---|---|
| Nc/N<0.2 | MONOCHROME OR GREY SCALE |
| Nc/N≧0.2 | COLOR |

Table 13B

| MINIMUM VALUE OF CHARACTER SIZE S min (UNIT: mm SQUARE) | RESOLUTION (UNIT: dpi) |
|---|---|
| 5.6≦Smin | 200dpi |
| 4.2≦Smin<5.6 | 300dpi |
| 2.8≦Smin<4.2 | 400dpi |
| Smin<2.8 | 600dpi |

Table 13C

| RATIO OF AREA OF PHOTOGRAPH REGION Sp TO AREA OF ORIGINAL IMAGE S | COLOR DEPTH (NUMBER OF BITS) |
|---|---|
| Sp/S<0.2 | 1 BIT |
| Sp/S≧0.2 | 8 BITS |

Fig. 20

| IMAGE REGIONS | IMAGE PARTICULARS |
|---|---|
| CHARACTER | · COLOR DEPTH:   1 BIT (BINARY VALUE)<br>· RESOLUTION:     300dpi<br>· COMPRESSION SYSTEM:   MMR |
| PHOTOGRAPH | · COLOR DEPTH:  24 BIT<br>· RESOLUTION:     150dpi<br>· COMPRESSION SYSTEM:   JPEG |

Fig. 28

Table 28A

| NUMBER OF ASSIGNED PAGES | RESOLUTION (dpi) |
|---|---|
| 1 | 72 |
| 2 | 103 |
| 3 | 125 |
| 4 | 144 |
| 8 | 204 |

Table 28B

| NUMBER OF ASSIGNED PAGES | RESOLUTION (dpi) |
|---|---|
| 1 | 100 |
| 2 | 141 |
| 3 | 173 |
| 4 | 200 |
| 8 | 283 |

Table 28C

| NUMBER OF ASSIGNED PAGES | RESOLUTION (dpi) |
|---|---|
| 1 | 200 |
| 2 | 283 |
| 3 | 346 |
| 4 | 400 |
| 8 | 567 |

Table 28D

| NUMBER OF ASSIGNED PAGES | RESOLUTION (dpi) |
|---|---|
| 1 | 400 |
| 2 | 567 |
| 3 | 600 |
| 4 | 600 |
| 8 | 600 |

Fig. 29

Table 29A

| RATIO OF NUMBER OF COLOR PIXELS Nc TO TOTAL NUMBER OF PIXELS OF ORIGINAL N | COLOR MODE IN HIGH SPEED MODE |
|---|---|
| Nc/N<0.4 | MONOCHROME |
| Nc/N≧0.4 | COLOR |

Table 29D

| RATIO OF NUMBER OF COLOR PIXELS Nc TO TOTAL NUMBER OF PIXELS OF ORIGINAL N | COLOR MODE IN HIGH-IMAGE QUALITY MODE |
|---|---|
| Nc/N<0.1 | MONOCHROME |
| Nc/N≧0.1 | COLOR |

Table 29B

| MINIMUM VALUE OF CHARACTER SIZE Smin(mm SQUARE) | RESOLUTION IN HIGH SPEED MODE (dpi) |
|---|---|
| 4.9≦Smin | 200 |
| 3.5≦Smin<4.9 | 300 |
| 2.5≦Smin<3.5 | 400 |
| Smin<2.5 | 600 |

Table 29E

| MINIMUM VALUE OF CHARACTER SIZE Smin(mm SQUARE) | RESOLUTION IN HIGH-IMAGE QUALITY MODE (dpi) |
|---|---|
| 7.0≦Smin | 200 |
| 4.9≦Smin<7.0 | 300 |
| 3.5≦Smin<4.9 | 400 |
| Smin<3.5 | 600 |

Table 29C

| RATIO OF AREA OF PHOTOGRAPH REGIONS Sp TO AREA OF ORIGINAL S | COLOR DEPTH IN HIGH SPEED MODE |
|---|---|
| Sp/S<0.4 | 1ビット |
| Sp/S≧0.4 | 8ビット |

Table 29F

| RATIO OF AREA OF PHOTOGRAPH REGIONS Sp TO AREA OF ORIGINAL S | COLOR DEPTH IN HIGH-IMAGE QUALITY MODE |
|---|---|
| Sp/S<0.1 | 1ビット |
| Sp/S≧0.1 | 8ビット |

Fig. 31A
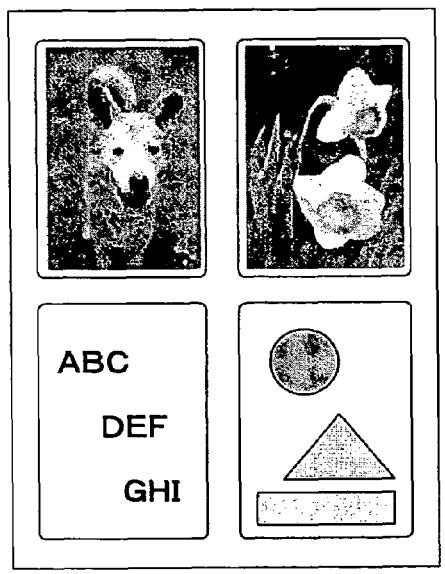
Fig. 31B
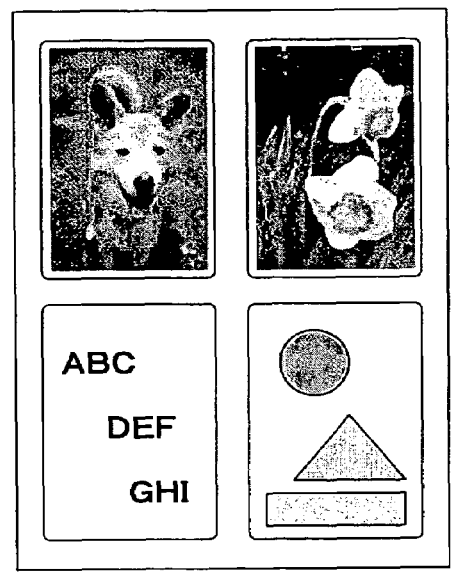
Fig. 31C
Fig. 31D
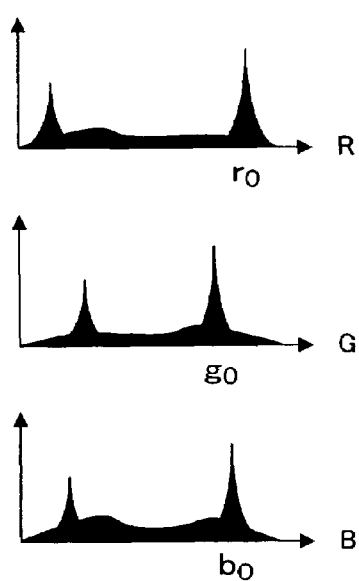
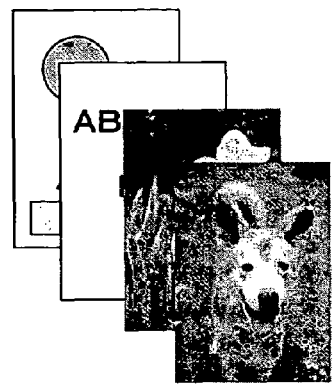

IMAGE PROCESSING APPARATUS AND METHOD FOR DIVIDING AN IMAGE INTO COMPONENT IMAGES

RELATED APPLICATION INFORMATION

This application is based upon and claims the benefit of priority from the prior Japanese Patent Application No. 2005-82641, filed on Mar. 22, 2005; the entire contents of which are incorporated herein by reference.

BACKGROUND OF THE INVENTION

1. Field of the Invention

This invention relates to an image processing apparatus and an image processing method. More particularly, it relates to an image processing apparatus and an image processing method for dividing a document image to produce images of individual image areas or dividing a document image formed by assigning a plurality of pages to produce individual images of the pages.

2. Description of the Related Art

Image forming apparatus such as printers include those having an N in 1 printing feature of arranging the printing data of a plurality of pages received from a computer so as to print images of reduced sizes of the pages on a single sheet of recording paper. In other words, it is possible to print N pages on a single sheet of recording paper by assigning the data of the N pages to the sheet of recording paper by means of the N in 1 printing feature. There may be cases where the user of such an N in 1 printing feature wants to take in a document image formed by such space assignment by means of the N in 1 printing feature and reuse the electronic data of each of the pages, or each of the page images, in a condition before it is assigned to a sheet of recording paper with the other pages.

Additionally, there may be cases where the user wants to reuse the electronic data of each photograph, character or graphic on a sheet of document, or a document image, as electronic data of an image region.

Jpn. Pat. Appln. Laid-Open Publication No. 2002-215380 discloses a technique of dividing a document image formed by space assignment into individual page images. Jpn. Pat. Appln. Laid-Open Publication No. 2003-87562 discloses a technique of dividing a sheet of document image into images of image regions. However, the techniques disclosed in the above-cited patent documents are not developed by taking the easiness of viewing of the page images produced as a result of dividing the document image or the images of image regions and the data size into consideration. Therefore, the images produced by dividing a document image can often be short of resolution and it is difficult for the viewer to read small characters contained in the images produced by the division. Additionally, when the document image is partly printed in color, all the images produced by the division are preserved as full color images. Then, the size of the full color images produced by the division has to be made unnecessarily large.

If the images produced by such a division are not objects of easy viewing, the value of the images produced by the division is damaged when they are reused. If the images produced by such a division have an unnecessarily large size, a large memory region has to be used to preserve them and it takes a long processing time when they are reused.

SUMMARY OF THE INVENTION

In view of the above identified circumstances, it is therefore the object of the present invention to provide an image processing apparatus and an image processing method that can produce component images obtained by dividing an input image as objects of easy viewing and, at the same time, of a small data size.

In an aspect of the present invention, there is provided an image processing apparatus comprising: an image input device for inputting information of a document image; an image analyzing device for analyzing the image particulars of the input document image obtained by the image input device or component images contained in the input document image; an image dividing device for dividing the input document image into the component images according to the outcome of the analysis by the image analyzing device; an image particulars determining device for determining the image particulars of the image or each of the images analyzed by the image analyzing device according to the outcome of analysis of the image analyzing device; an image particulars converting device for converting the image particulars obtained by the analysis by the image analyzing device to the image particulars determined by the image particulars determining device; and a device for outputting the information of the component images having the image particulars converted by the image particulars converting device.

In another aspect of the present invention, there is provided an image processing apparatus comprising: an original reading device for reading information of a document image, an image analyzing device for analyzing the image particulars of the input document image acquired for the first time by the original reading device; an image particulars determining device for determining the image particulars of the input document image according to the outcome of analysis of the image analyzing device; an input mode selecting device for selecting an input mode for the original reading device according to the image particulars determined by the image particulars determining device; an image dividing device for dividing the input document image into page images according to the outcome of the analysis made by the image analyzing device of document image acquired for the second time by the original reading device in the input mode selected by the input selecting device; and a device for outputting the information of the page images produced by the image dividing device.

According to the invention, the expression of space assignment has a meaning different from the meaning of the terms as used in the bookbinding industry and the printing industry. In the bookbinding industry and the printing industry, the expression of space assignment refers to an operation of plate making or printing for printing a plurality of pages on a single sheet of paper from the viewpoint of productivity so as to cause the pages of a printed matter to be arranged in a proper order when the complete printed matter comes out. Take, for example, a printed sheet that includes the first page of a copy of a newspaper having 32 pages, the first page is printed at the left side (or the right side) of the sheet, while the 32nd page is printed at the right side (or the left side) whichever appropriate, of the sheet. In other words, the first page and the 32nd page are arranged together on a same plate and printed at the same time. On the other hand, for the purpose of the present invention, the expression of space assignment refers to an operation of printing a plurality of pages of an original on a sheet of paper or preparing electronic data for an original in such a way that a plurality of pages, or N pages, of the original are found on a sheet of paper when they are printed. Additionally, an image obtained by printing a plurality of pages, or N pages, of an original on a sheet of paper is referred to as an N in 1 image for the purpose of the present invention.

BRIEF DESCRIPTION OF THE DRAWINGS

The accompanying drawings, which are incorporated in and constitute a part of the specification, illustrate presently preferred embodiments of the invention:

FIG. 6 is a schematic illustration of an operation for determining the resolution of image as a function of the number of assigned pages of the second and third embodiments of the invention;

FIG. 13 is a schematic illustration of the image particulars determined by the image particulars determining section of the fourth embodiment of the invention, as shown in Tables 13A through 13C;

FIG. 20 is a schematic illustration of the image particulars determined for each image region by the seventh embodiment of the invention;

FIG. 28 is a schematic illustration of the default values of resolution when the output device, the output medium and other elements are specified in the first mode of operation of the eleventh embodiment of the invention, as shown in Table 28A through Table 28D;

FIG. 29 is a schematic illustration of the image particulars determined when the output mode is specified in the second mode of operation of the eleventh embodiment of the invention, as shown in Table 29A through Table 29F;

FIG. 31A is a schematic illustration of an image that may be input to the twelfth embodiment of image processing apparatus of the invention as input document image, FIG. 31B is a schematic illustration of an image obtained by computationally drawing density histograms in the longitudinal direction and in the transversal direction for the input document image input to the twelfth embodiment of image processing apparatus of the invention as shown in FIG. 31A, FIG. 31C is a schematic illustration of the R, G, B histograms computationally drawn for a region surrounding a region that is judged to be a frame in the first mode of operation of the twelfth embodiment of the invention, and FIG. 31D is a schematic illustration of the page images obtained by replacing the colors of the pixels in the regions that are judged to be a frame by (ro, go, bo) illustrated in FIG. 31C in the first mode of operation of the twelfth embodiment of the invention;

DETAILED DESCRIPTION OF THE INVENTION

Throughout this description, the embodiments and examples shown should be considered as exemplars, rather than limitations on the apparatus and the method of the present invention.

Now, the present invention will be described in greater detail by referring to the accompanying drawings that illustrate preferred embodiments of the invention.

First Embodiment

Figure 1:
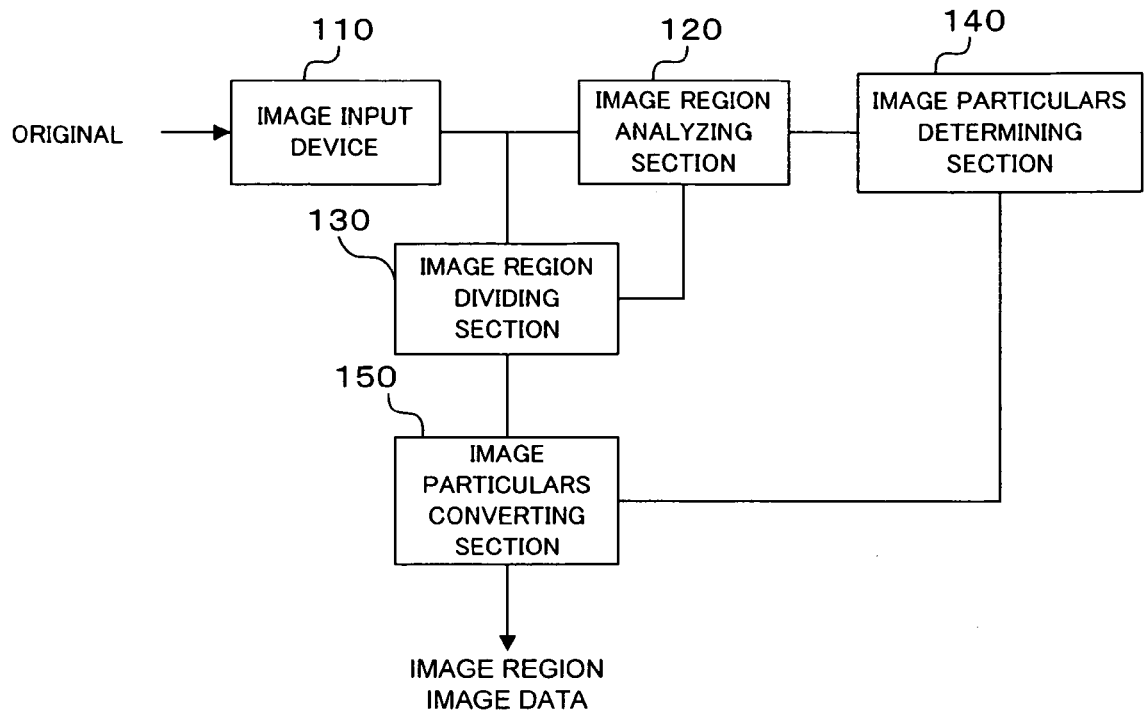
FIG. 1 is a schematic functional block diagram of the first embodiment of image processing apparatus according to the invention, illustrating the configuration thereof.

FIG. 1 is a schematic functional block diagram of the first embodiment of image processing apparatus according to the invention. Referring to FIG. 1, the first embodiment of image processing apparatus comprises an image input device 110, an image region analyzing section 120, an image particulars determining section 130, an image region dividing section 140 and an image particulars converting section 150.

The image input device 110 of this embodiment is a means for inputting the image information expressed on a document original to the image processing apparatus as electronic data. A scanner or the original reading section of a copying machine or a multi-function peripheral (to be referred to as MFP hereinafter) corresponds to the image input device 110 of this embodiment. Additionally, a communication interface such as a LAN interface or a USB interface also corresponds to the image input device 110 of this embodiment. For the purpose of simplicity of description, the image input device of this embodiment will be described as such an original reading section unless specifically noted otherwise.

The image region analyzing section 120 analyzes the image regions contained in the document image read in by the image input device 110. Image regions are regions having common characteristics. For example, characters, graphics and photographs are different image regions. The image region analyzing section 120 outputs the types and positions of the image regions contained in the input image. The image region dividing section 130 divides the input image into image regions. The image particulars determining section 140 determines the image particulars of each image region depending on the type of the image region. The image particulars converting section 150 converts the image particulars of each of the image regions produced by the division into the image particulars of the image region as determined by the image particulars determining section 140.

Figure 2:
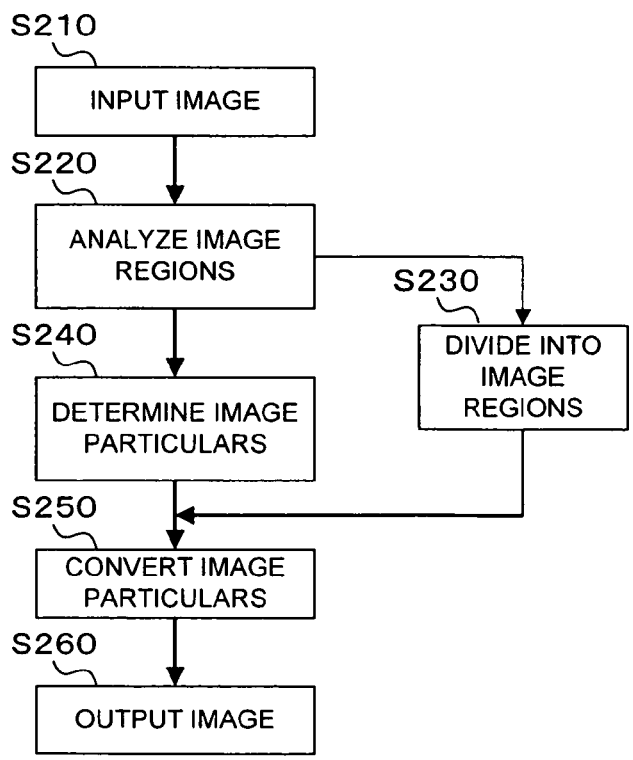
FIG. 2 is a flowchart of operation of the first embodiment of image processing apparatus according to the invention.

FIG. 2 is a flowchart of the operation of the first embodiment of image processing apparatus. Now, the operation of the first embodiment of image processing apparatus according to the invention will be described below by referring to FIGS. 1 and 2.

Firstly, the embodiment reads in an image of the document original by means of the image input device 110 (S210). More specifically, the embodiment inputs the electronic data of the document original by means of the original reading section, which may be a scanner or the like. At this time, the reading resolution is set to a high resolution level such as the highest resolution level of the scanner and, when the original contains colored parts, the original is read in a high quality color image reading mode. Then, in S220, the image region analyzing section 120 analyzes the format of the input image and outputs the type and position of each image region contained in the input image. The image region dividing section 130 divides the input image into image regions according to the information output from the image region analyzing section 120 (S230). For example, the image region dividing section 130 divides the input image into character regions and photograph regions. The image particulars determining section 140 determines the image particulars of each of the image regions according to the information output from the image region analyzing section 120 and the type of the image region (S240).

Figures 3, 4:
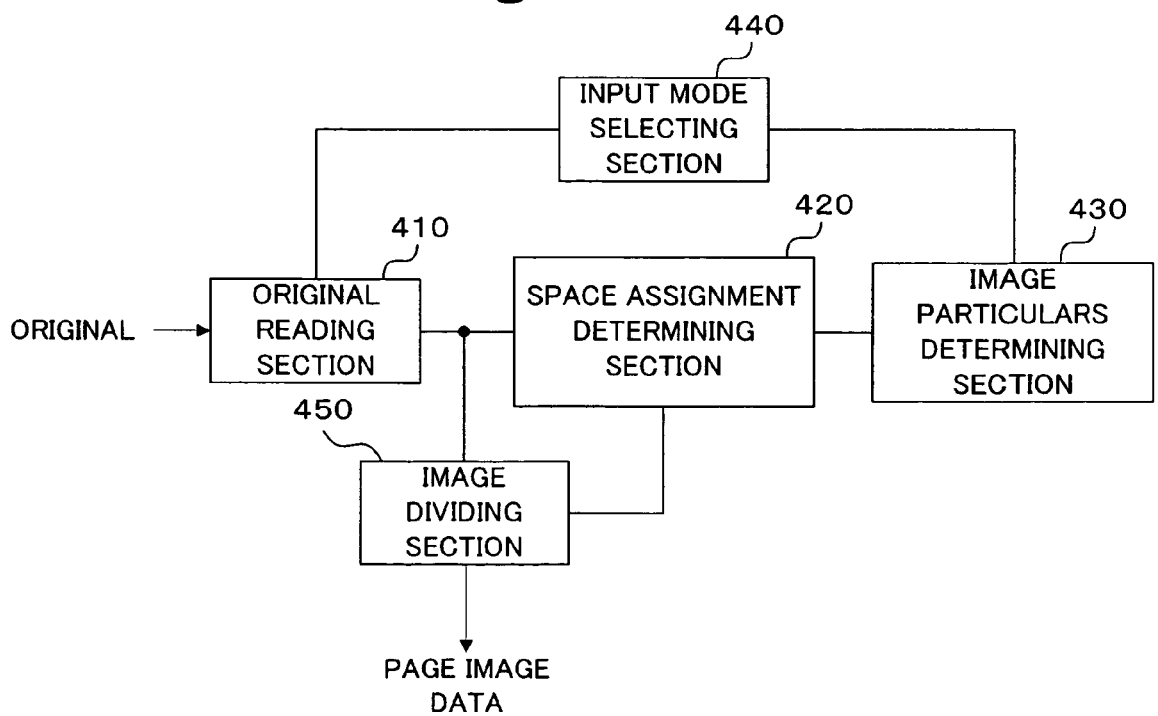
FIG. 3 is a schematic illustration of an operation for determining the image particulars of each image region of the first embodiment of the invention.
FIG. 4 is a schematic functional block diagram of the second embodiment of image processing apparatus according to the invention, illustrating the configuration thereof.

For example, as shown in FIG. 3, the resolution may be more emphasized than the tone for the image particulars of a character region, whereas the tone may be more emphasized than the resolution for the image particulars of a photograph region. The image particulars of each of the image regions of the image produced as a result of the division of the image in S230 are converted into the image particulars determined in S240 by the image particulars determining section 140 by the image particulars converting section 150 (S250). For the conversion of the image particulars by the image particulars converting section 150, each image may be subjected to data compression that is suitable to the image region. The image data of each image region output from the image particulars converting section 150 may be utilized by a client PC and/or an image server.

While the first embodiment is described above, it is not necessary to produce electronic data from the document original image by means of the original reading section, which may be a scanner or the like, when electronic data of the document original exist and are available. With this embodiment, the electronic data of the original can be input to the image region analyzing section 120 and the image region dividing section 130 by way of a communication interface that is a type of image input device. This description of the situation is not limited to this embodiment and also applicable to the third embodiment, the fifth through seventh embodiments and the eighth through twelfth embodiments that are realized by providing the preceding embodiments with additional features.

As this embodiment determines the image particulars of each image region and processes the input document original, it is possible to obtain image data for the image regions of an appropriate file size that can be viewed with ease if compared with any conventional image processing apparatus of the type under consideration that process an image without taking the attributes of each image region into consideration.

Second Embodiment

FIG. 4 is a schematic functional block diagram of the second embodiment of image processing apparatus according to the invention. Referring to FIG. 4, the second embodiment of image processing apparatus comprises an original reading section 410, a space assignment determining section 420, an image particulars determining section 430, an input mode selecting section 440 and an image dividing section 450.

The original reading section 410 is a means for inputting the image information expressed on a document original to the image processing apparatus as electronic data. The space assignment determining section 420 determines if the original read in by the original reading section 410 is formed by assigning a plurality of pages to the space of the original or not. If the document image that is read in is formed by assigning a plurality of pages to the space of the original, the space assignment determining section 420 determines the positions for dividing the image. The space assignment determining section 420 additionally determines the number of pages assigned to the original that is read in. Any of the known techniques for determining the space assignment including the one disclosed in Jpn. Pat. Appln. Laid-Open Publication No. 2002-215380 may be used for determining the space assignment for the purpose of this invention.

The image particulars determining section 430 determines the image particulars of the page image data output from this embodiment of image processing apparatus according to the number of pages assigned to the original as determined by the space assignment determining section 420. The image particulars to be determined by the image particulars determining section 430 may typically include resolution. The input mode selecting section 440 selects an input mode for the original reading section 410 according to the image particulars determined by the image particulars determining section 430. The image dividing section 450 divides the document image into page images according to the image dividing positions determined by the space assignment determining section 420.

Figure 5:
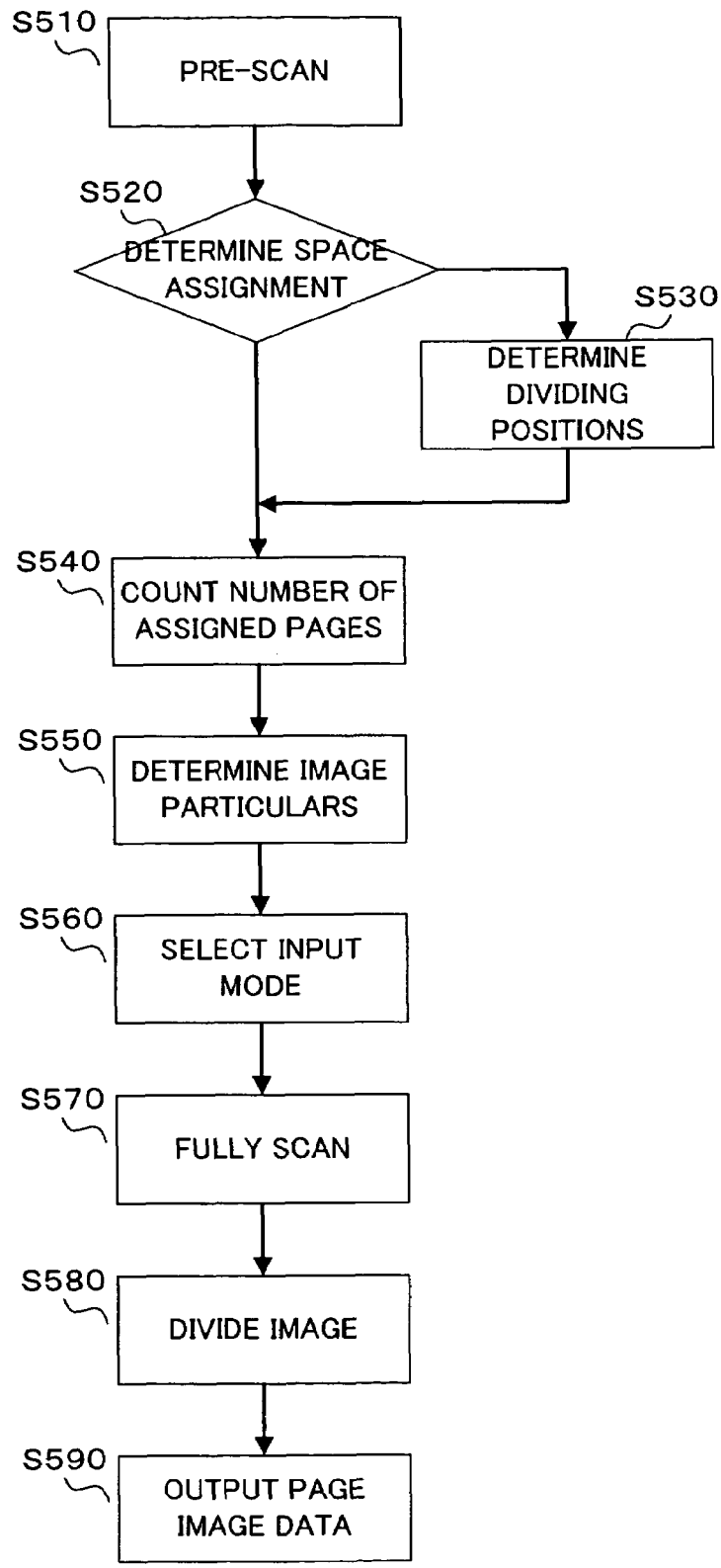
FIG. 5 is a flowchart of operation of the second embodiment of image processing apparatus according to the invention.

FIG. 5 is a flowchart of the operation of the second embodiment of image processing apparatus. Now, the operation of the second embodiment of image processing apparatus according to the invention will be described below by referring to FIGS. 4 and 5.

Firstly, the embodiment reads in an image of the document original by means of the image reading section 410 (S510). More specifically, the embodiment inputs the electronic data of the document original by means of the original reading section, which may be a scanner or the like. At this time, the operation of reading the input image is a so-called pre-scanning operation and a low resolution level may be selected for the reading resolution.

The space assignment determining section 420 determines if the input image expressed by the input image data input to it by the original reading section 410 is formed by assigning a plurality of pages to the space of the original or not according to the input image data (S520). If it is determined that the input image is formed by assigning a plurality of pages, the space assignment determining section 420 determines the positions for dividing the input image (S530). Additionally, the space assignment determining section 420 determines the number of pages assigned to the original (S540).

Then, the image particulars determining section 430 determines the resolution as one of the image particulars by referring to the number of pages assigned to the original as determined by the space assignment determining section 420 (S550). FIG. 6 schematically illustrates the resolutions determined as a function of the number of pages assigned to the original. As seen from FIG. 6, a high resolution is selected when the number of assigned pages is large. Then, a reading resolution is selected for the input mode of the original reading section 410 according to the determination by the image particulars determining section 430 (S560) and a full scanning operation is conducted (S570).

If it is determined that the original is formed by space assignment (S520), the input image read in by the full scanning operation is divided into page images at the dividing positions determined by the space assignment determining section 420 (S580). The data of the page images obtained by the division in S580 are output to a client PC, an image server and/or the image forming section of a multi-function peripheral (MFP), a copying machine or a printer (S590).

Thus, this embodiment provides page images that can be viewed with ease, when an image of an original that is formed by space assignment such as an N in 1 original is input, by automatically selecting an input mode for the image input device as a function of the number of pages N assigned to the original and fully scanning the original if the number of pages N is large.

Third Embodiment

Figure 7:
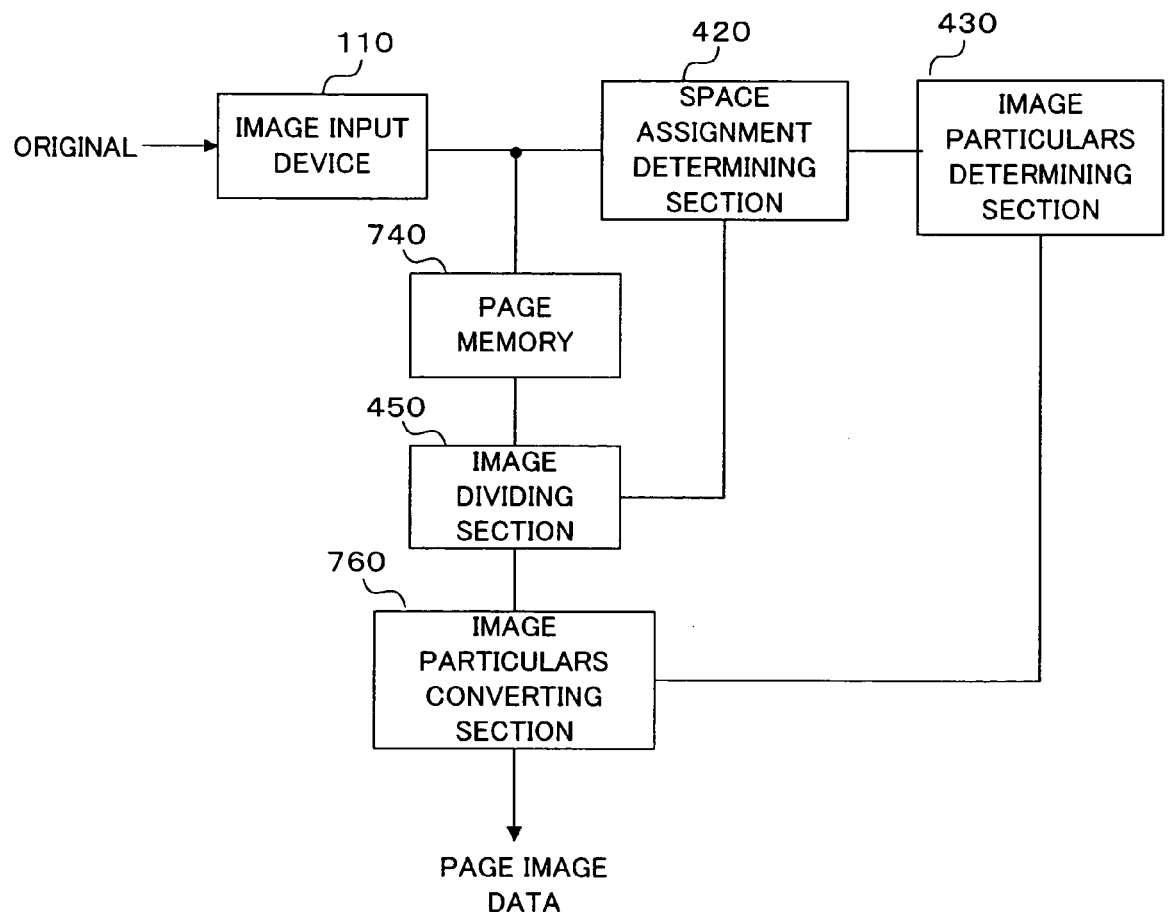
FIG. 7 is a schematic functional block diagram of the third embodiment of image processing apparatus according to the invention, illustrating the configuration thereof.

FIG. 7 is a schematic functional block diagram of the third embodiment of image processing apparatus according to the invention. Referring to FIG. 7, the third embodiment of image processing apparatus comprises an image input device 110, a space assignment determining section 420, an image particulars determining section 430, a page memory 740, an image dividing section 450 and an image particulars converting section 760.

The image input device 110 operates the same as the image input device of the first embodiment. The space assignment determining section 420, the image particulars determining section 430 and the image dividing section 450 operate respectively the same as the space assignment determining section, the image particulars determining section and the image dividing section 450 of the second embodiment. However, as will be described hereinafter, the operation of the image particulars determining section 430 differs from that of the image particulars determining section of the second embodiment at some points.

The page memory 740 operates as buffer for delaying the video signals output from the image input device 110. The image particulars converting section 760 converts the image particulars of the page images output from the image dividing section 450 to those determined by the image particulars determining section 430.

In the second embodiment, the mode of operation of the image input device is selected by the input mode selecting section at the time of the pre-scanning operation and subsequently image data are obtained with optimal image particulars in the full scanning operation. The third embodiment significantly differs from the second embodiment in that page images are output with optimal image particulars not by means of the input mode selecting section but by means of the image particulars converting section 760.

Figure 8:
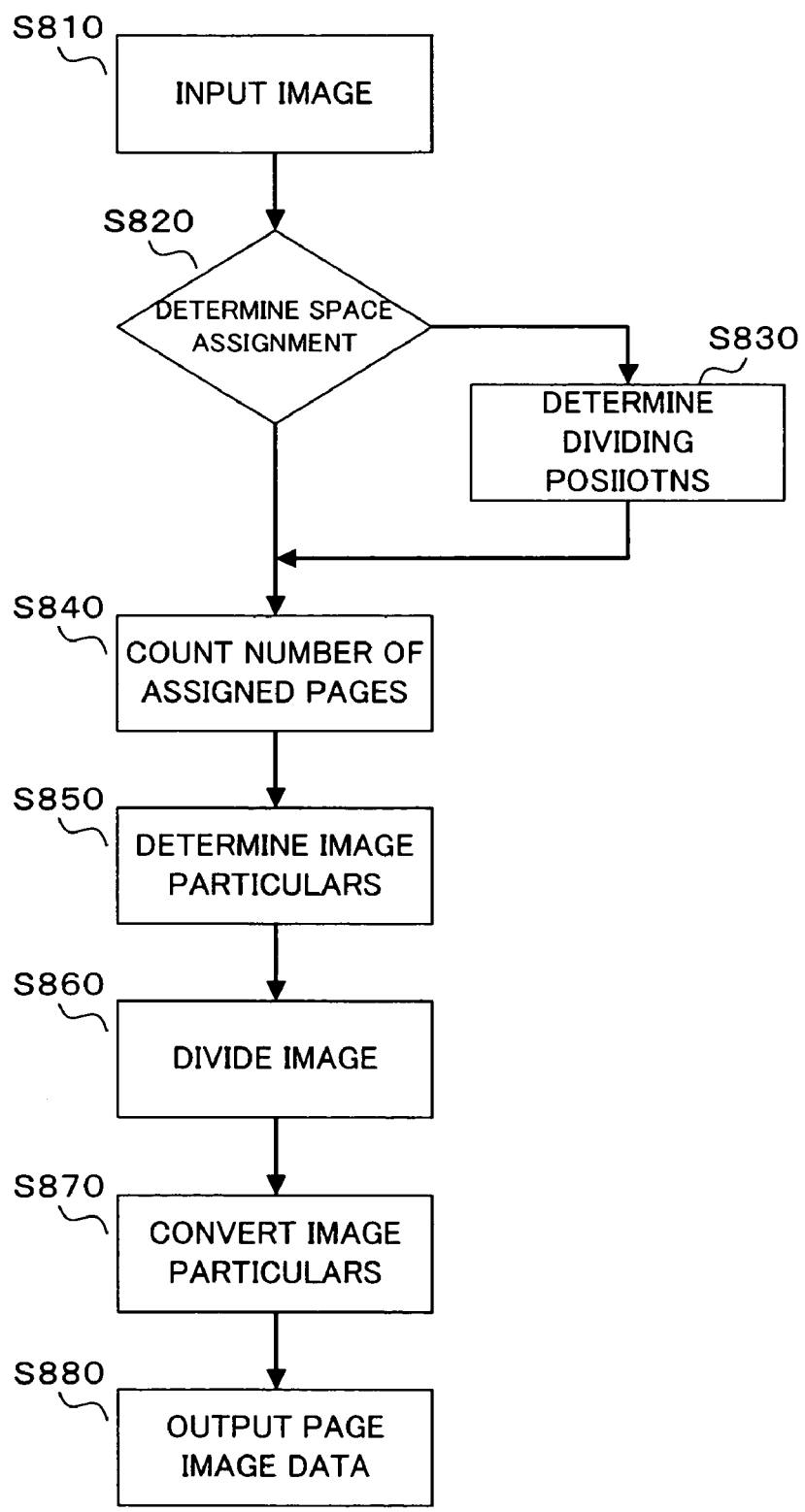
FIG. 8 is a flowchart of operation of the third embodiment of image processing apparatus according to the invention.

FIG. 8 is a flowchart of the operation of the third embodiment of image processing apparatus. Now, the operation of the third embodiment of image processing apparatus according to the invention will be described below by referring to FIGS. 7 and 8.

The operation of this embodiment from reading the image input of the image of the document original by means of the image input device 110 (S810) to determining the resolution as one of the image particulars from the image input by means of the image particulars determining section 430 (S850) is the same as that of the second embodiment. Note, however, the highest resolution is selected as the reading resolution for reading an image from the document original by means of the image input device 110, which may typically be a scanner.

When it is determined by the image dividing section 450 that the original is formed by space assignment as a result of space assignment determining operation (S820), it divides the input image into page images according to the dividing positions determined by the space assignment determining section 420 (S860). The resolution of the obtained page images is converted by the image particulars converting section 760 in a manner as determined by the image particulars determining section 430 (S870). Specific techniques that can be used for the resolution conversion include the known bi-cubic method. The data of the page images of which the resolution is converted by the image particulars converting section 760 is output to a client PC, an image server and/or the image forming section of a multi-function peripheral (MFP), a copying machine or a printer (S880).

With this embodiment, when an N in 1 original is input and the number of pages N is large, it is possible to obtain page images that can be viewed with ease at high speed without pre-scanning as a result of converting the image particulars according to the number of pages assigned to a space.

While a high resolution is selected as input resolution of the image input (S810) in the above description of the embodiment, it is also possible to select a relatively low input resolution of the image input in order to realize a high speed processing operation and the image particulars converting section may subsequently operate for raising the resolution (S870). Techniques that can be used for the operation of raising the resolution include the bi-linear method and the bi-cubic method, which are known to those skilled in the art.

The image particulars are converted (S870) after dividing the image of the original (S860) in the above description of the embodiment. However, the image of the original may be divided after converting the image particulars.

While the third embodiment is described above, it is not necessary to produce electronic data from the document original image by means of the original reading section, which may be a scanner or the like, when electronic data of the document original exist and are available. Then, it is possible to input the electronic data of the original to the space assignment determining section 420 and the page memory 740 by way of the communication interface that is a type of image input device.

Fourth Embodiment

Figure 9:
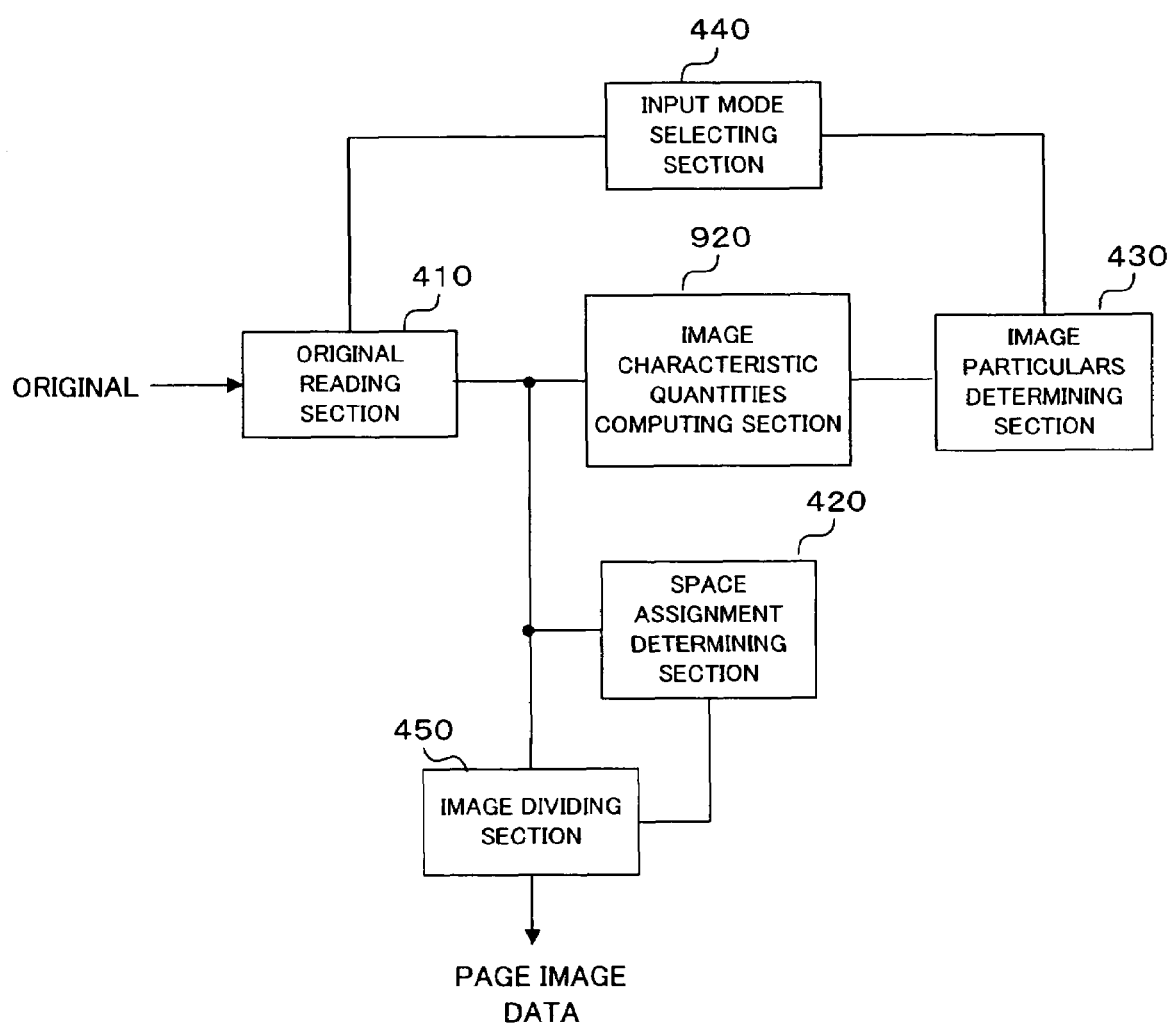
FIG. 9 is a schematic functional block diagram of the fourth embodiment of image processing apparatus according to the invention, illustrating the configuration thereof.

FIG. 9 is a schematic functional block diagram of the fourth embodiment of image processing apparatus according to the invention. Referring to FIG. 9, the fourth embodiment of image processing apparatus comprises an original reading section 410, an image characteristic quantities computing section 920, an image particulars determining section 430, a space assignment determining section 420, an input mode selecting section 440 and an image dividing section 450.

The fourth embodiment differs significantly from the second embodiment in that the image particulars are determined not by the space assignment determining section but by the image characteristic quantities computing section 920. The image characteristic quantities computing section 920 computes the total area of the character regions, the total area of the photograph regions, the minimum value of the character sizes, the number of color pixels, the area of the original and the total number of pixels of the original. The image particulars determining section 430 determines the resolution, the number of colors and the number of bits as image particulars. The original reading section 410, the space assignment determining section 420, the input mode selecting section 440 and the image dividing section 450 operate like their counterparts of the second embodiment.

Figure 10:
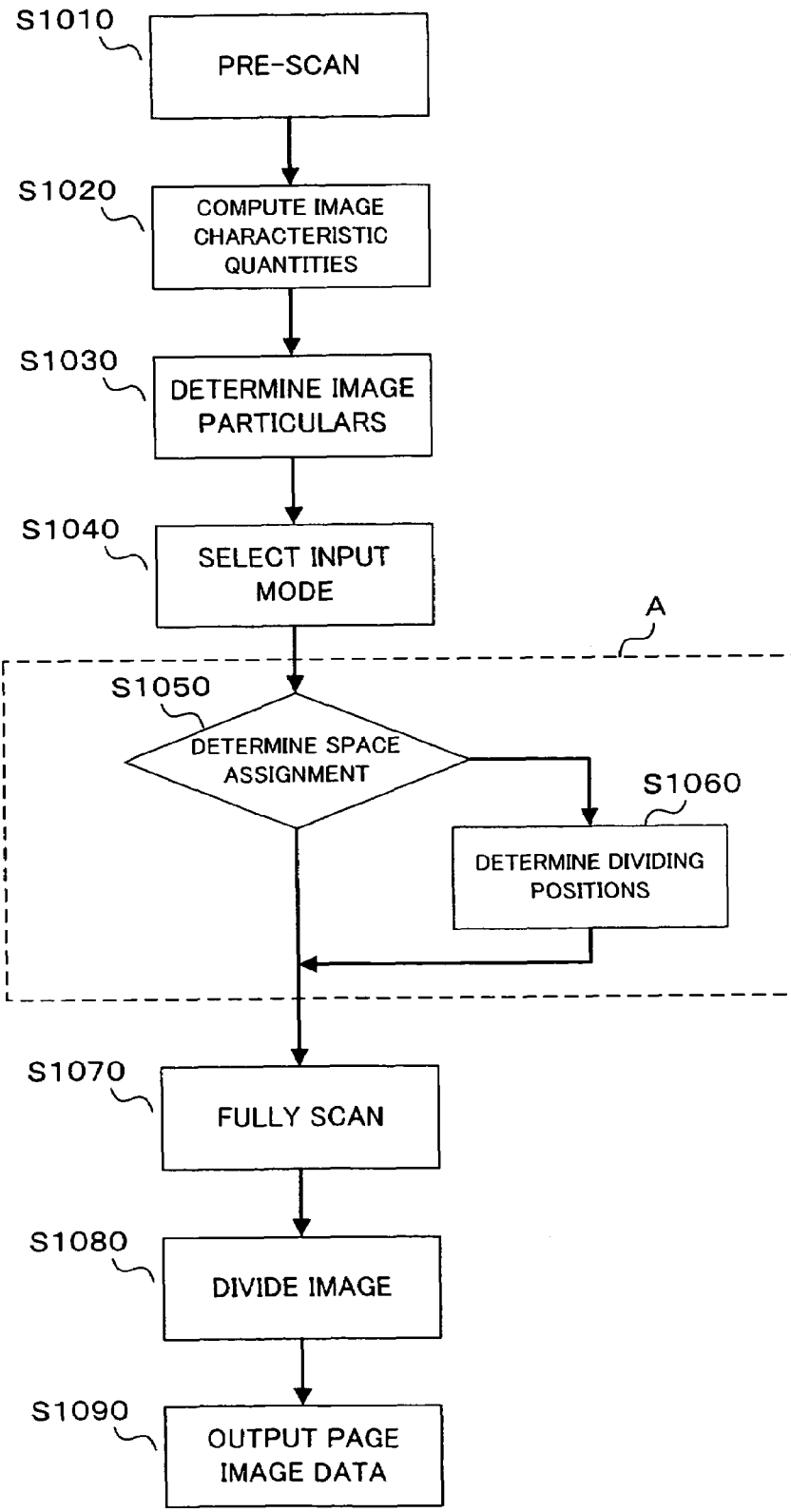
FIG. 10 is a flowchart of operation of the fourth embodiment of image processing apparatus according to the invention.

FIG. 10 is a flowchart of the operation of the fourth embodiment of image processing apparatus. Now, the operation of the fourth embodiment of image processing apparatus according to the invention will be described below by referring to FIGS. 9 and 10.

Firstly, the original reading section 410 reads in an image of the document original (S1010). More specifically, the embodiment reads in an image of the document original by means of an image input device, which may be a scanner or the like. At this time, while a low resolution level may be selected for the reading resolution, a color image reading mode is selected for the operation.

Then, the image characteristic quantities computing section 920 analyzes the image particulars of the image of the original output from the original reading section 410 by computationally determining the characteristic quantities of the image of the original in terms of the total area of the character regions, the total area of the photograph regions, the minimum value of the character sizes, the number of color pixels, the area of the original image and the total number of pixels of the original (S1020).

Thereafter, the image particulars determining section 430 determines the image particulars including the resolution, the number of colors and the number of bits by means of the characteristic quantities of the image output from the image characteristic quantities computing section 920 (S1030). Then, the input mode of the original reading section 410 is selected so as to make it agree with the input mode determined by the image particulars determining section 430 (S1040).

The space assignment determining section 420 determines if the original is formed by assigning a plurality of pages or not according to the document image data acquired by the original reading section 410 (S1050). If it is determined that the original is formed by space assignment, the space assignment determining section 420 determines the positions to be used for dividing the image (S1060). As described above for the second embodiment, any of the known techniques for determining the space assignment including the one disclosed in Jpn. Pat. Appln. Laid-Open Publication No. 2002-215380 may be used for determining the space assignment.

The subsequent fully scanning operation (S1070), the operation of dividing the image into page images (Step S1080) and that of outputting the page image data (S1090) are the same as those of the second embodiment.

While the operation of determining the space assignment (S1050) and that of determining the positions to be used for dividing the image (S1060), which are enclosed by frame A of dotted lines in FIG. 10, are conducted after selecting the input mode (S1040) in the above description of the operation of the embodiment made by referring to FIG. 10, the operation of determining the space assignment (S1050) and that of determining the positions to be used for dividing the image (S1060) may alternatively be conducted after the pre-scanning operation (S1010), the operation of computationally determining the characteristic quantities of the image (S1020) or that of determining the image particulars (S1030).

Figure 11:
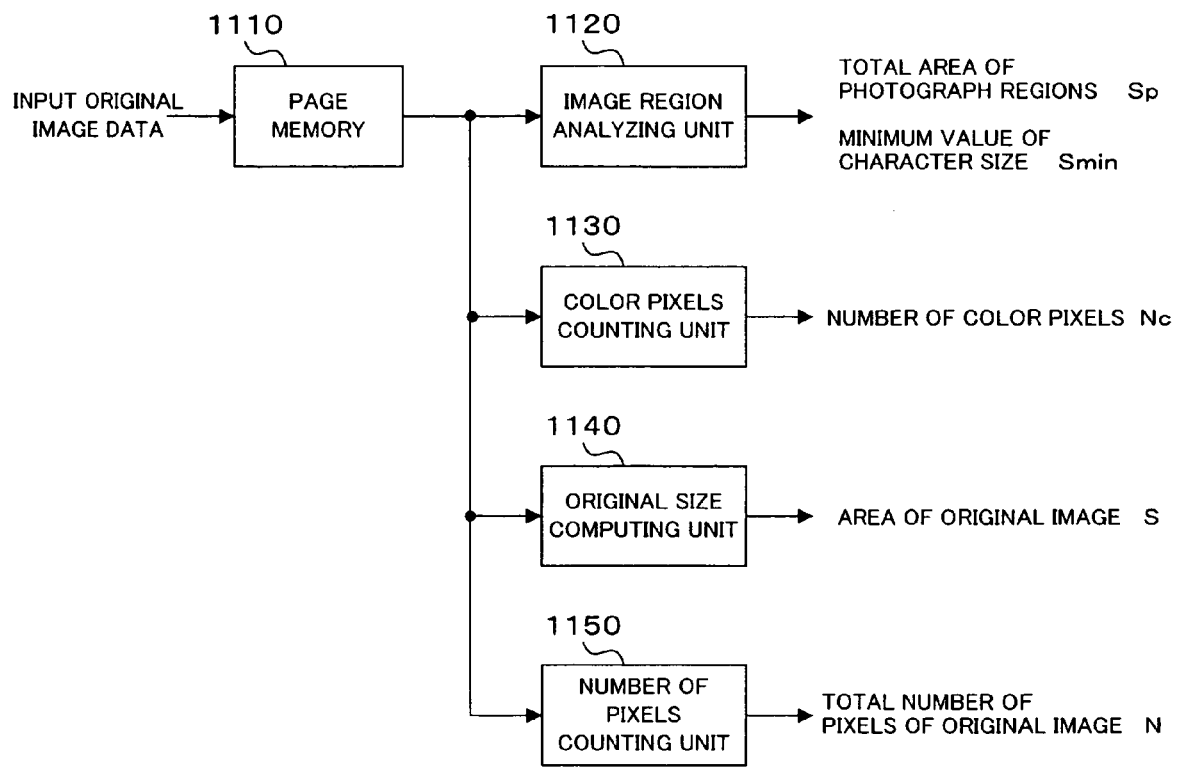
FIG. 11 is a schematic functional block diagram of the image characteristic quantities computing section of the fourth embodiment of the invention, illustrating the configuration thereof.

FIG. 11 is a schematic block diagram of the image characteristic quantities determining section 920, showing the configuration thereof. Referring to FIG. 11, the page memory 1110 converts the original image data input by the unit of a line or several lines into block data on a page unit. The output of the page memory 1110 is input to the image region analyzing unit 1120, the color pixels counting unit 1130, the original size computing unit 1140 and the number of pixels counting unit 1150.

Figure 12A:
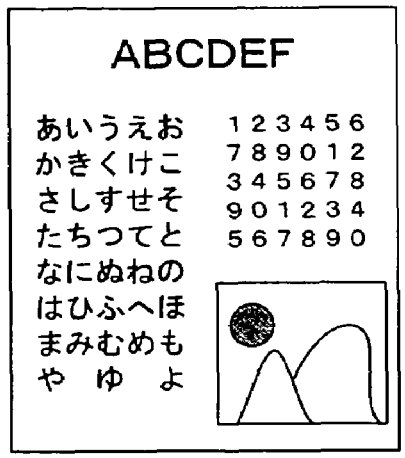
FIG. 12A is an example of image that can be input to an image processing apparatus according to the invention.
Figure 12B:
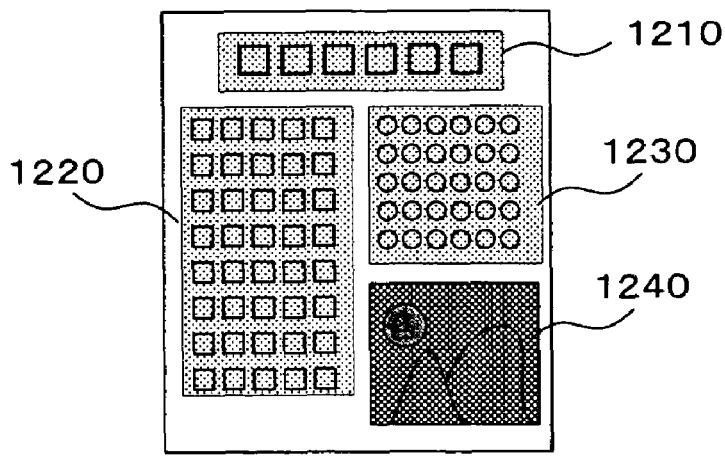
FIG. 12B is a schematic illustration of the outcome of image region analysis conducted on the input image of FIG. 12A by the image region analyzing unit illustrated in FIG. 11.

As shown in FIGS. 12A and 12B, the image region analyzing unit 1120 divides the input original image data into regions where characters and graphics are physically or logically linked, extracts them and analyzes them for the types of elements of the document such as characters and photographs and the degrees of significance of them. For the following description, it is assumed that an image as illustrated in FIG. 12A is input to the image processing apparatus according to the invention. The input image of FIG. 12A includes a character string of alphabet letters, character strings of numerals, character strings of Japanese kana-letters and a photograph. Referring to FIG. 12B, the image region analyzing unit 1120 recognizes the regions 1210, 1220, 1230 as character regions and the region 1240 as a photograph region. Additionally, the image region analyzing unit 1120 analyzes the character regions 1210, 1220, 1230 and outputs the minimum value Smin of the character sizes, while it also analyzes the photograph region 1240 and output the total area Sp of the photograph region. For example, the method disclosed in Jpn. Pat. Appln. Laid-Open Publication No. 2003-87562 may be used for the operation of analyzing image regions.

The color pixels counting unit 1130 counts the number of color pixels in the input original image data. For example, if the colors of the pixels are expressed by (R, G, B) in the document image data, the pixels that satisfies the requirement of |R·G|+|G·B|+|B·R|>Th (a threshold value) are counted as color pixels. The original size computing unit 1140 outputs the area S of the image of the original. The number of pixels counting unit 1150 counts the total number of pixels N of the image of the original.

FIG. 13 is a schematic illustration of the image particulars determined by the image particulars determining section 430 of the fourth embodiment of the invention, as shown in Tables 13A through 13C. In FIG. 13, Table 13A shows an example of selecting a color mode and Table 13B shows an example of determining the resolution, while Table 13C shows an example of determining the color depth (number of bits). The selection of a color mode for determining if the original is to be read in full color or in monochrome (or by grey scale) can be achieved by referring to the ratio of the number of color pixels Nc to the total number of pixels of the document image N as illustrated in Table 13A. In this embodiment, the input original is judged to be a monochrome original and the image is treated in monochrome or by grey scale if the ratio of the number of color pixels Nc to the number of pixels of the original N is smaller than 0.2, or Nc/N>0.2, whereas the input original is judged to be a color image for the image particulars when Nc/N≧0.2. As for the resolution for reading the original, a resolution that allows the characters of the minimum size in the original to be read is selected. For example, the resolution is selected by referring to the minimum size Smin (mm square) of the character sizes as shown in Table 13B. In the instance of Table 13B, a resolution of 200 dpi is selected for 5.6≦Smin and a resolution of 300 dpi is selected for 4.2≦Smin<5.6, whereas a resolution of 400 dpi is selected for 2.8≦Smin<4.2 and a resolution of 600 dpi is selected for Smin<2.8. As for the color depth, a color depth is selected depending if the original includes a photograph or not. For example, the color depth is determined by referring to the ratio of the area Sp of the photograph region to the area S of the original as shown in Table 13C. In the instance of Table 13C, the original is so judged as to include only characters and a color depth of 1 bit is selected when Sp/S<0.2, whereas the original is so judged as to include a photograph and a color depth of 8 bits is selected when Sp/S≧0.2.

In this way, the reading mode of the original reading section 410 is selected according to the image particulars determined by the image particulars determining section 430 and the original is fully scanned. Then, the document image is divided into page images according to the dividing positions as determined by the space assignment determining section 420.

As this embodiment automatically selects an input mode for the operation of the original reading section according to the characteristics of the image of an original before acquiring the document image data when the original is input and found to be an N in 1 original, it is possible to obtain image data for page images of an appropriate file size that can be viewed with ease if the original includes small characters.

Fifth Embodiment

Figure 14:
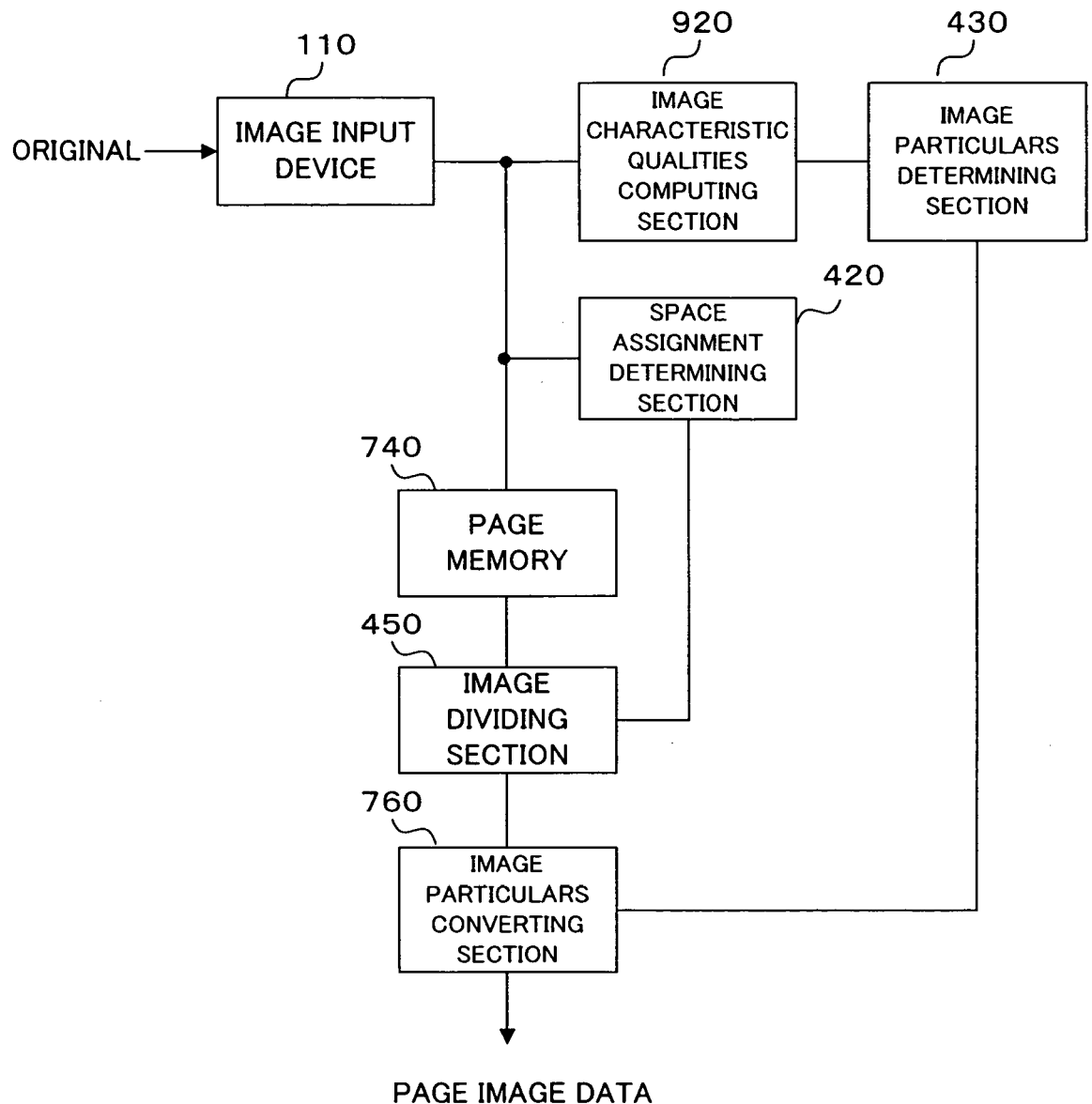
FIG. 14 is a schematic functional block diagram of the fifth embodiment of image processing apparatus according to the invention, illustrating the configuration thereof.

FIG. 14 is a schematic functional block diagram of the fifth embodiment of image processing apparatus according to the invention. Referring to FIG. 14, the fifth embodiment of image processing apparatus comprises an image input device 110, an image characteristic quantities computing section 920, an image particulars determining section 430, a space assignment determining section 420, a page memory 740, an image dividing section 450 and an image particulars converting section 760.

The fifth embodiment differs from the fourth embodiment just like the third embodiment differs from the second embodiment. In other words, this embodiment comprises an image particulars converting section 760 so that it can output an image with optimal image particulars without requiring a pre-scanning operation.

Figure 15:
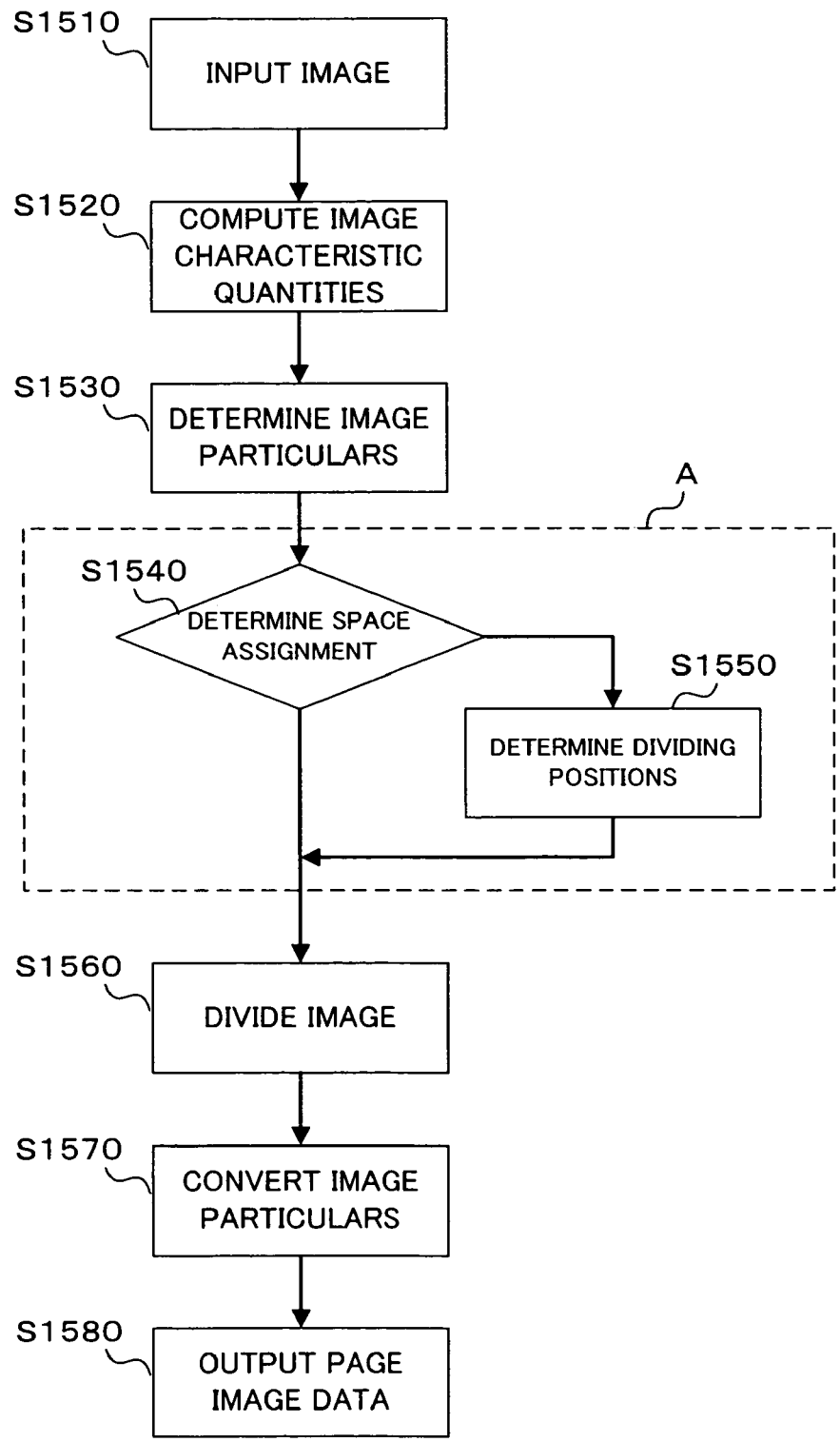
FIG. 15 is a flowchart of operation of the fifth embodiment of image processing apparatus according to the invention.

FIG. 15 is a flowchart of the operation of the fifth embodiment of image processing apparatus. Now, the operation of the fifth embodiment of image processing apparatus according to the invention will be described below by referring to FIGS. 14 and 15.

Firstly, the image input device 110 reads in an image of the document original (S1510). More specifically, the embodiment reads in an image of the document original by means of an image input device, which may be a scanner or the like. At this time, a high resolution level is selected for the reading resolution of the image input device and color image reading mode is selected for the operation.

Then, the image characteristic quantities computing section 920 analyzes the image particulars of the image of the original acquired from the image input device 110 by computationally determining the characteristic quantities of the image of the original in terms of the total area of the character regions, the total area of the photograph regions, the minimum value of the character sizes, the number of color pixels, the area of the original and the total number of pixels of the original (S1520).

Thereafter, the image particulars determining section 430 determines the image particulars including the resolution, the number of colors and the number of bits by means of the characteristic quantities of the image output from the image characteristic quantities computing section 920 (S1530).

Then, the space assignment determining section 420 determines if the original is produced by assigning a plurality of pages to it from the document image data acquired by the image input device 110 (S1540). If it is determined that the original is produced by assigning a plurality of pages to it, the space assignment determining section 420 then determines the positions for dividing the image (S1550).

When it is determined by the space assignment determining operation in S1550 that the original is produced by space assignment, the document image is divided into page images according to the dividing positions determined by the space assignment determining section 420 (S1560). After the division into page images, the image particulars converting section 760 converts the image particulars according to the image particulars determined by the image particulars determining section 430 (S1570). The data of the page images for which the image particulars are converted by the image particulars converting section 760 are then output to a client PC, an image server and/or the image forming section of a multifunction peripheral (MFP), a copying machine or a printer (S1580).

This embodiment makes it possible to obtain image data of page images of an appropriate file size that can be viewed with ease without any pre-scanning operation if an N in 1 original is input.

The image particulars are converted (S1570) after dividing the image of the original (S1560) in the above description of the embodiment by referring to FIG. 15. However, the image of the original may be divided after converting the image particulars.

While the operation of determining the space assignment (S1540) and that of determining the positions to be used for dividing the image (S1550), which are enclosed by frame A of dotted lines in FIG. 15, are conducted after determining the image particulars (S1530) in the above description of the operation of the embodiment made by referring to FIG. 15, the operation of determining the space assignment (S1050) and that of determining the positions to be used for dividing the image (S1060) may alternatively be conducted after the operation of inputting the image (S1510) or that of computationally determining the characteristic quantities of the image (S1520).

While the fifth embodiment is described above, it is not necessary to produce electronic data from the document original image by means of the original reading section, which may be a scanner or the like, when electronic data of the document original exist and are available. Then, it is possible to input the electronic data of the original to the image characteristic quantities computing section 920, the space assignment determining section 420 and the page memory 740 by way of the communication interface that is a type of image input device.

Sixth Embodiment

Figure 16:
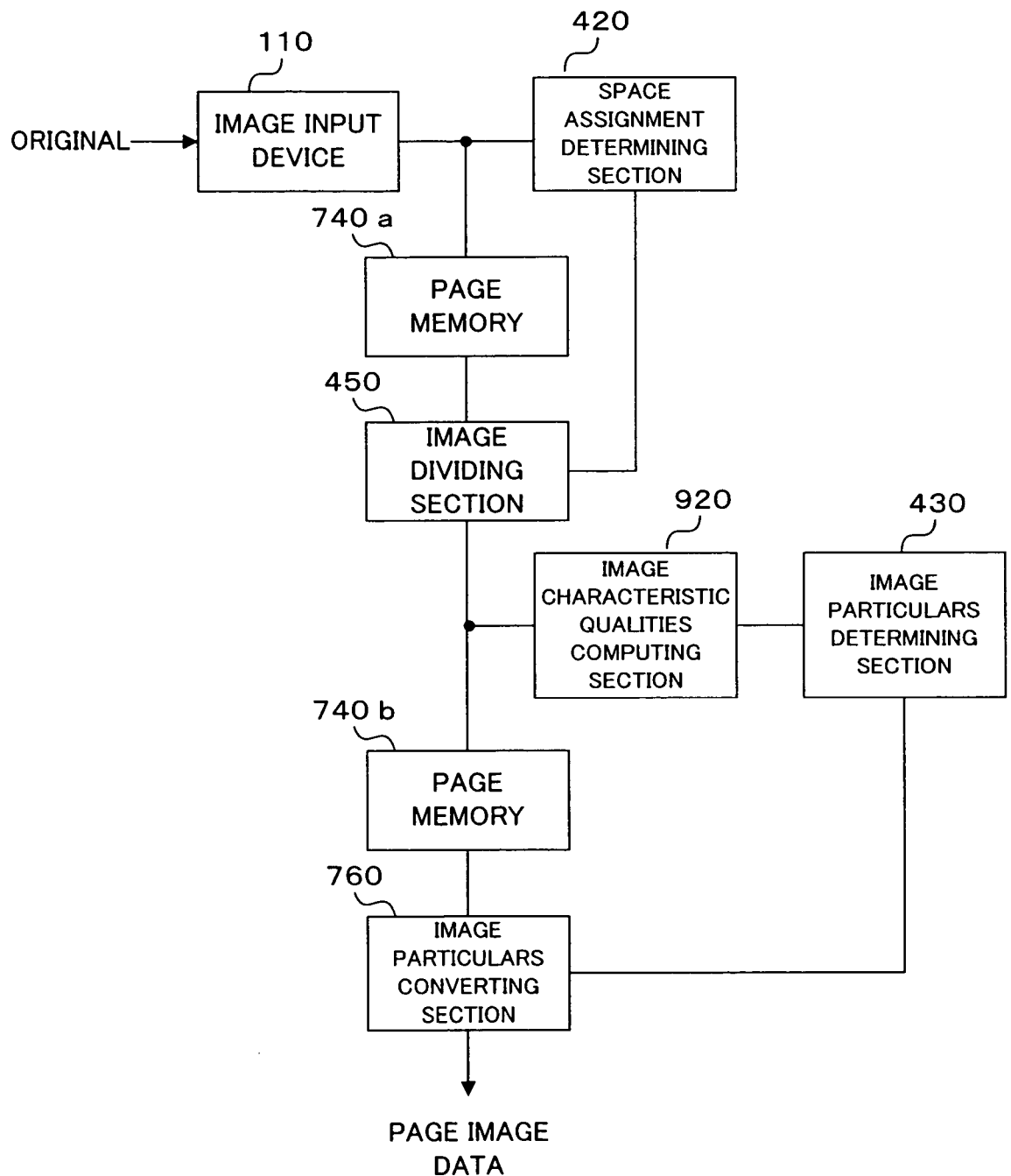
FIG. 16 is a schematic functional block diagram of the sixth embodiment of image processing apparatus according to the invention, illustrating the configuration thereof.

FIG. 16 is a schematic functional block diagram of the sixth embodiment of image processing apparatus according to the invention. Referring to FIG. 16, the sixth embodiment of image processing apparatus comprises an image input device 110, a space assignment determining section 420, page memories 740a, 740b, an image dividing section 450, an image characteristic quantities computing section 920, an image particulars determining section 430 and an image particulars converting section 760.

This embodiment differs from the fifth embodiment in that this embodiment determines about space assignment according to the outcome of determination of the space assignment determining section 420, divides the input image into page images by means of the image dividing section 450 and subsequently computationally determines characteristic quantities of the page images. With this arrangement, it is possible to optimally determine the image particulars of each page image.

Figure 17:
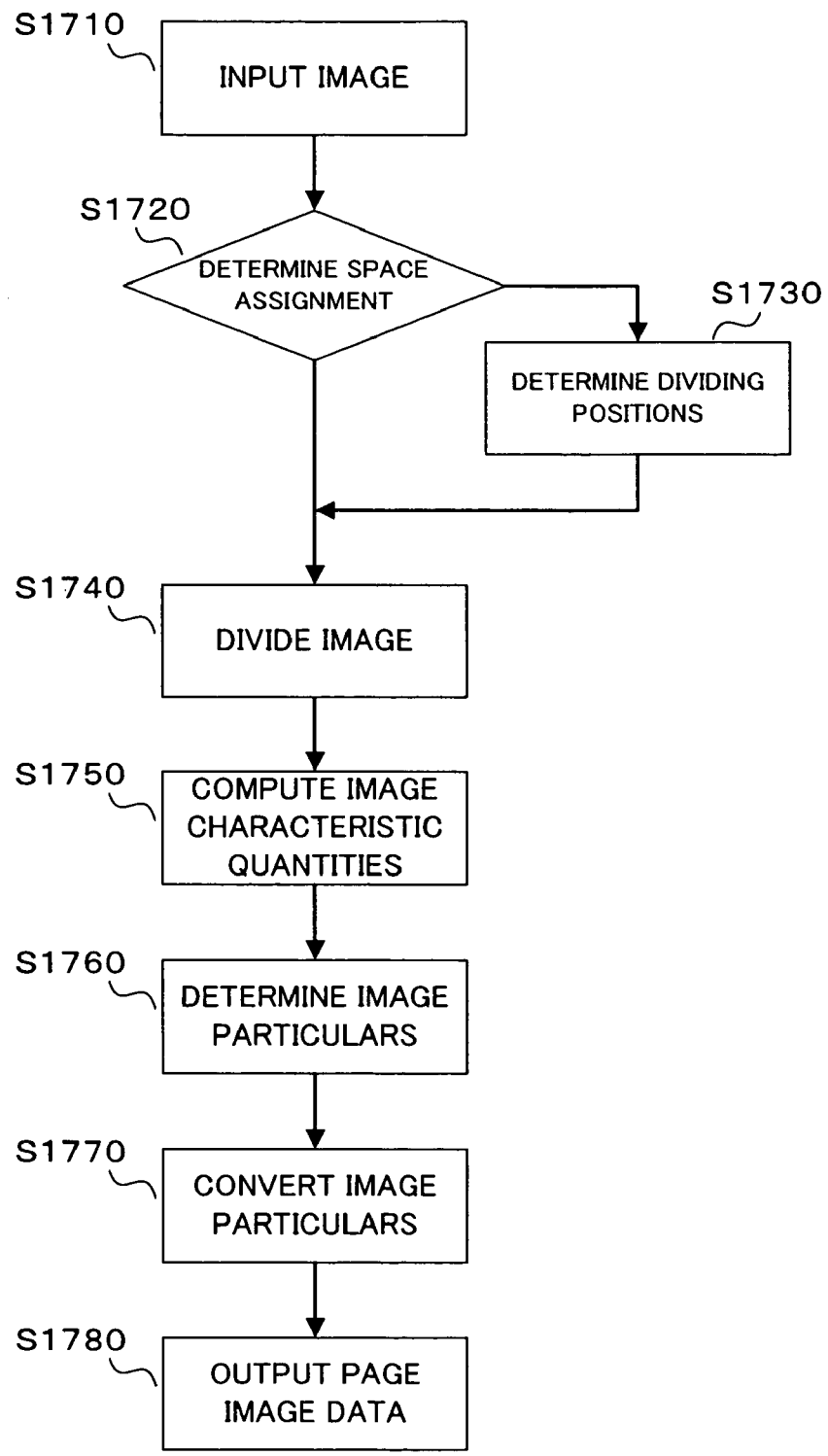
FIG. 17 is a flowchart of operation of the sixth embodiment of image processing apparatus according to the invention.

FIG. 17 is a flowchart of the operation of the sixth embodiment of image processing apparatus. Now, the operation of the sixth embodiment of image processing apparatus according to the invention will be described below by referring to FIGS. 16 and 17.

Firstly, the image input device 110 reads in an image of the document original (S1710). More specifically, the embodiment reads in an image of the document original by means of an image input device, which may be a scanner or the like. At this time, a high resolution level is selected for the reading resolution of the image input device and high quality color image reading mode is selected for the operation.

Then, the space assignment determining section 420 determines if the original is produced by assigning a plurality of pages to it from the document image data acquired by the image input device 110 (S1720). If it is determined that the original is produced by assigning a plurality of pages to it, it then determines the positions for dividing the image (S1730). Additionally, if it is determined by the space assignment determining section 420 that the original is produced by space assignment, the document image is divided into page images according to the dividing positions determined by the space assignment determining section 420 (S1740).

Thereafter, the image characteristic quantities computing section 920 analyzes the image particulars of the page images output from the dividing section 450 by computationally determining the characteristic quantities in terms of the total area of the character regions, the total area of the photograph regions, the minimum value of the character sizes, the number of color pixels, the area of the original and the total number of pixels of the original (S1750).

Then, the image particulars determining section 430 determines the image particulars including the resolution, the number of colors and the number of bits by means of the characteristic quantities of the image output from the image characteristic quantities computing section 920 (S1760).

After the division of the document image into page images, the image particulars converting section 760 converts the image particulars according to the image particulars determined by the image particulars determining section 430 (S1770). The data of the page images for which the image particulars are converted by the image particulars converting section 760 are then output to a client PC, an image server and/or the image forming section of a multi-function peripheral (MFP), a copying machine or a printer (S1780).

This embodiment makes it possible to obtain image data of page images of an appropriate file size that can be viewed with ease if an N in 1 original is input.

While the sixth embodiment is described above, it is not necessary to produce electronic data from the document original image by means of the original reading section, which may be a scanner or the like, when electronic data of the document original exist and are available. Then, it is possible to input the electronic data of the original to the space assignment determining section 420 and the page memory 740 by way of the communication interface that is a type of image input device.

Seventh Embodiment

Figure 18:
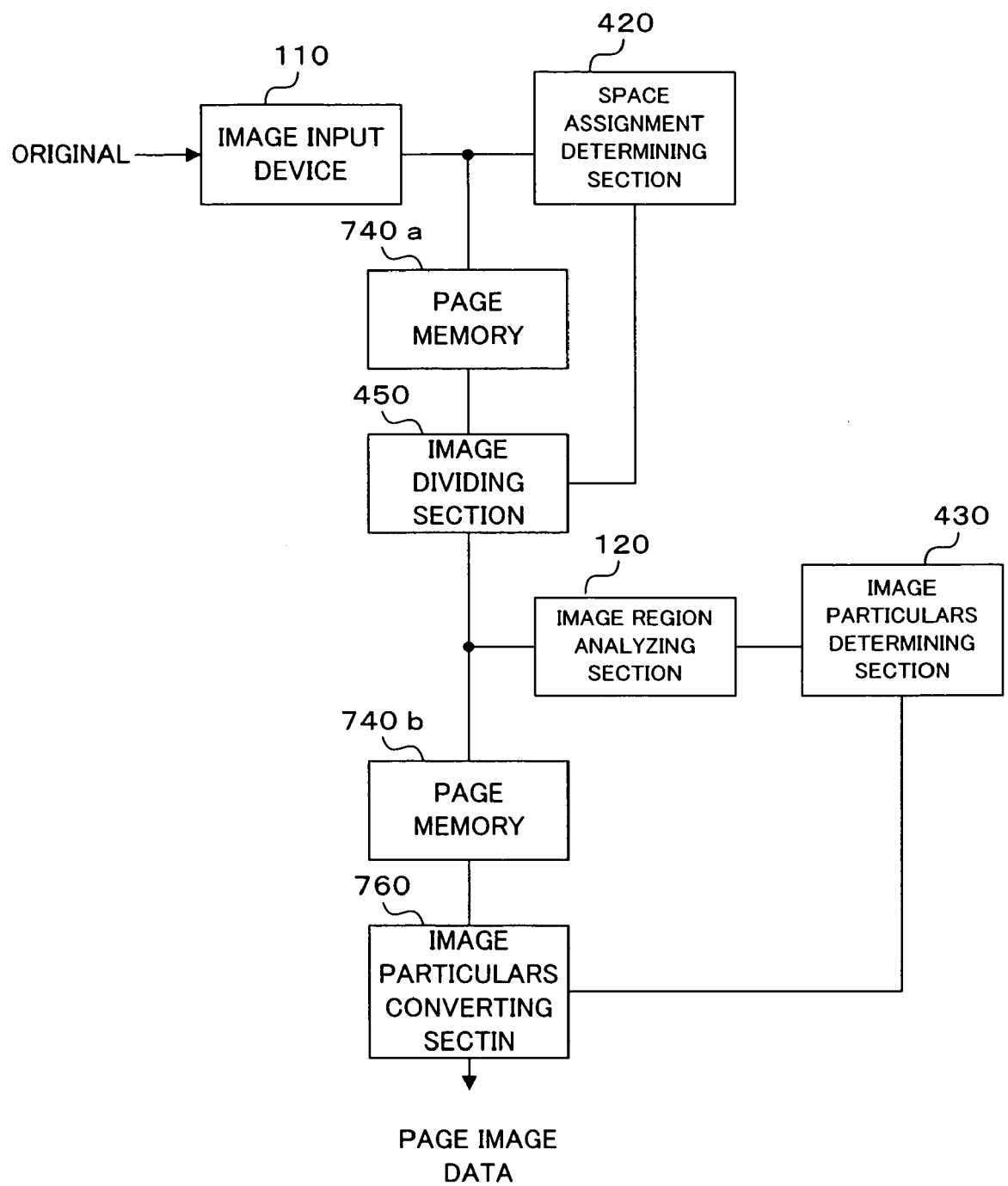
FIG. 18 is a schematic functional block diagram of the seventh embodiment of image processing apparatus according to the invention, illustrating the configuration thereof.

FIG. 18 is a schematic functional block diagram of the seventh embodiment of image processing apparatus according to the invention. Referring to FIG. 18, the seventh embodiment of image processing apparatus comprises an image input device 110, a space assignment determining section 420, page memories 740a, 740b, an image dividing section 450, an image region analyzing section 120, an image particulars determining section 430 and an image particulars converting section 760.

This embodiment differs from the sixth embodiment in that the image characteristic quantities computing section 920 of the sixth embodiment is replaced by the image region analyzing section 120. With this arrangement, it is possible to optimally determine the image particulars of each image region contained in a page image.

Figure 19:
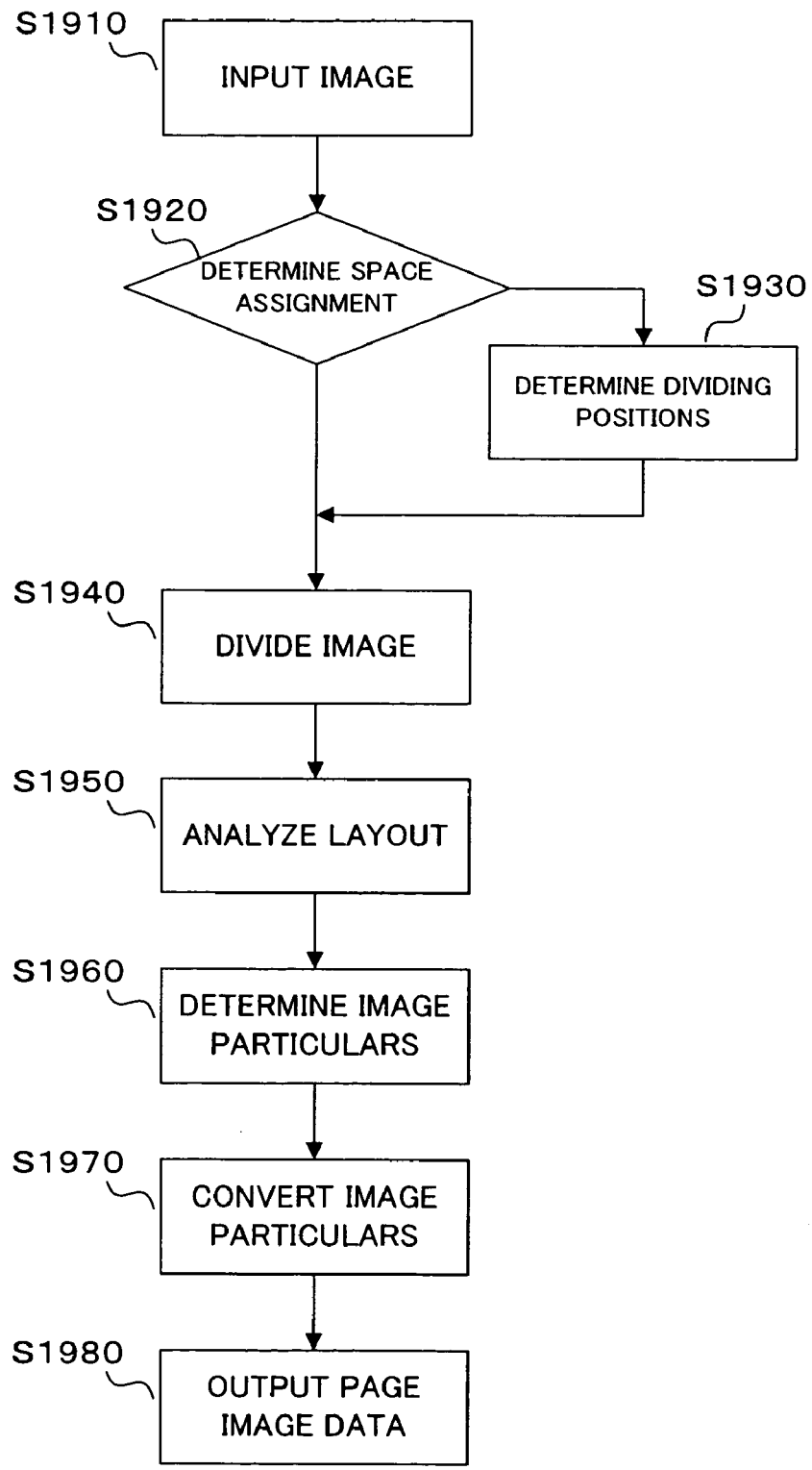
FIG. 19 is a flowchart of operation of the seventh embodiment of image processing apparatus according to the invention.

FIG. 19 is a flowchart of the operation of the seventh embodiment of image processing apparatus. Now, the operation of the seventh embodiment of image processing apparatus according to the invention will be described below by referring to FIGS. 18 and 19.

The operation of this embodiment from inputting an image in S1940 to dividing the input image in S1940 is the same as that of the sixth embodiment described above by referring to FIG. 17.

The image region analyzing section 120 analyzes the image particulars of the image regions in each of the page images produced by the image dividing section 450 by dividing the document image in S1940 (S1950). For example, the image region analyzing section analyzes each of the page images to find out that one or more than one character regions and one or more than one photograph regions are included in the page image and divide the page image into different image regions including one or more than one character regions and one or more than photograph regions (S1950).

Then, the image particulars determining section 430 determines the image particulars of each image region according to the image region information output from the image region analyzing section 120 (S1960).

The image particulars converting section 760 converts the image particulars of each page image according to the image particulars determined by the image particulars determining section 430 after dividing each of the page images into image regions (S1970). FIG. 20 is a schematic illustration of an example of the image particulars determined for each image region by the seventh embodiment of the invention. In the instance of the image particulars illustrated in FIG. 20, the resolution is more emphasized than the tone for each character image region and the color depth is made shallow. On the other hand, the tone is more emphasized than the resolution for each photograph image region and the color depth is made deep. Additionally, a data compression system that is suited to each image region is selected.

The data of the page images for which the image particulars are converted by the image particulars converting section 760 are then output to a client PC, an image server and/or the image forming section of a multi-function peripheral (MFP), a copying machine or a printer (S1980).

If compared with an arrangement where the image particulars of each entire page image are determined, this embodiment makes it possible to output image data of page images of an appropriate file size that can be viewed with ease if an N in 1 original is input because suitable image particulars are determined for each image region. This embodiment is particularly suitable when page images are output in a file format of having an object structure such as PDF and being capable of selecting a color depth, a resolution and a data compression system for each object.

While the seventh embodiment is described above, it is not necessary to produce electronic data from the document original image by means of the original reading section, which may be a scanner or the like, when electronic data of the document original exist and are available. Then, it is possible to input the electronic data of the original to the space assignment determining section 420 and the page memory 740 by way of the communication interface that is a type of image input device.

Eighth Embodiment

This embodiment is effective to prevent errors when dividing a document image into page images according to the present invention.

Figure 21:
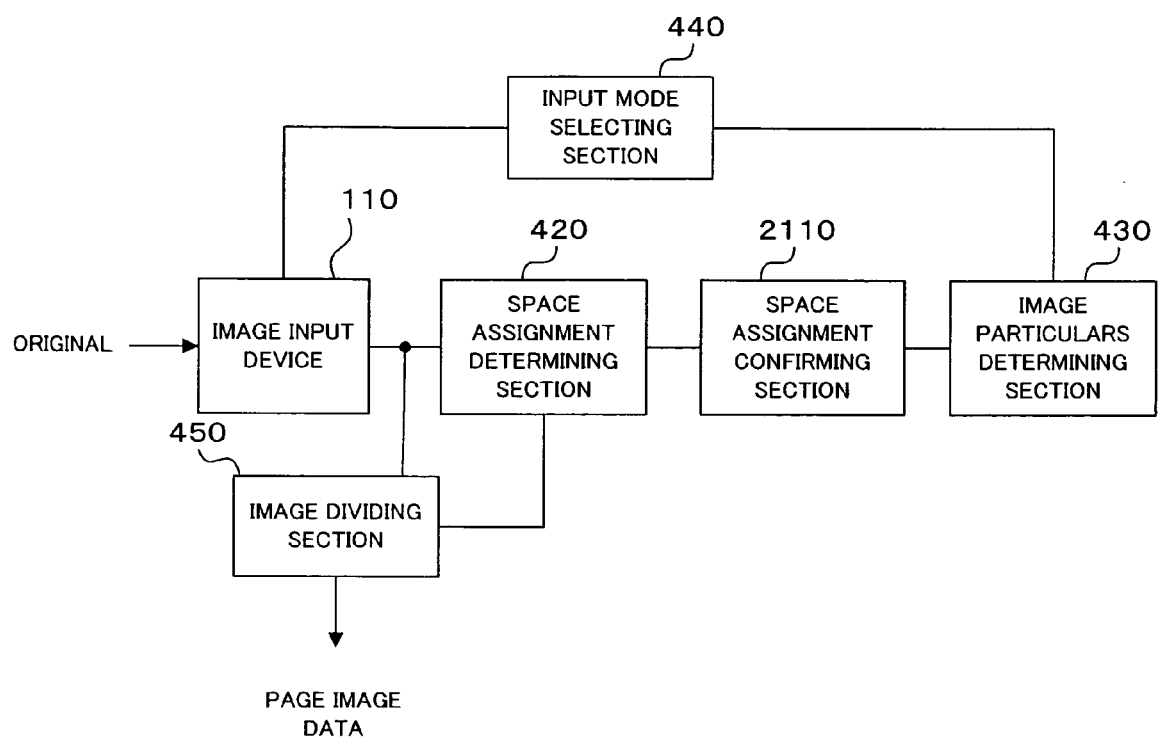
FIG. 21 is a schematic functional block diagram of the eighth embodiment of image processing apparatus according to the invention, illustrating the configuration thereof.

FIG. 21 is a schematic functional block diagram of the eighth embodiment of image processing apparatus according to the invention, which is obtained by modifying the second embodiment. By comparing FIG. 21 with FIG. 4 that schematically illustrates a functional block diagram of the second embodiment, it will be seen that this embodiment differs from the second embodiment in that a space assignment confirming section 2110 is added to the space assignment determining section 420 in this embodiment.

Figure 22:
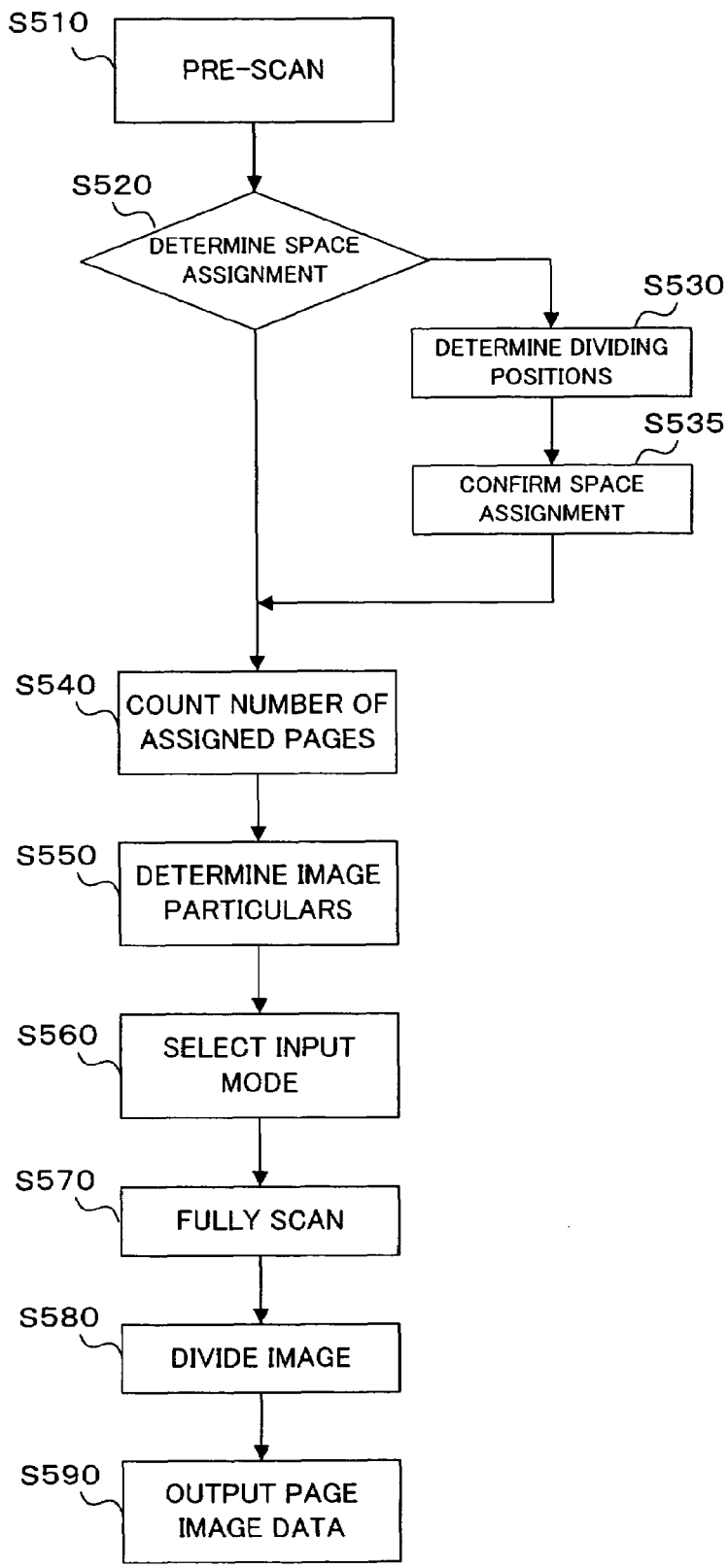
FIG. 22 is a flowchart of operation of the eighth embodiment of image processing apparatus according to the invention.
Figure 23:
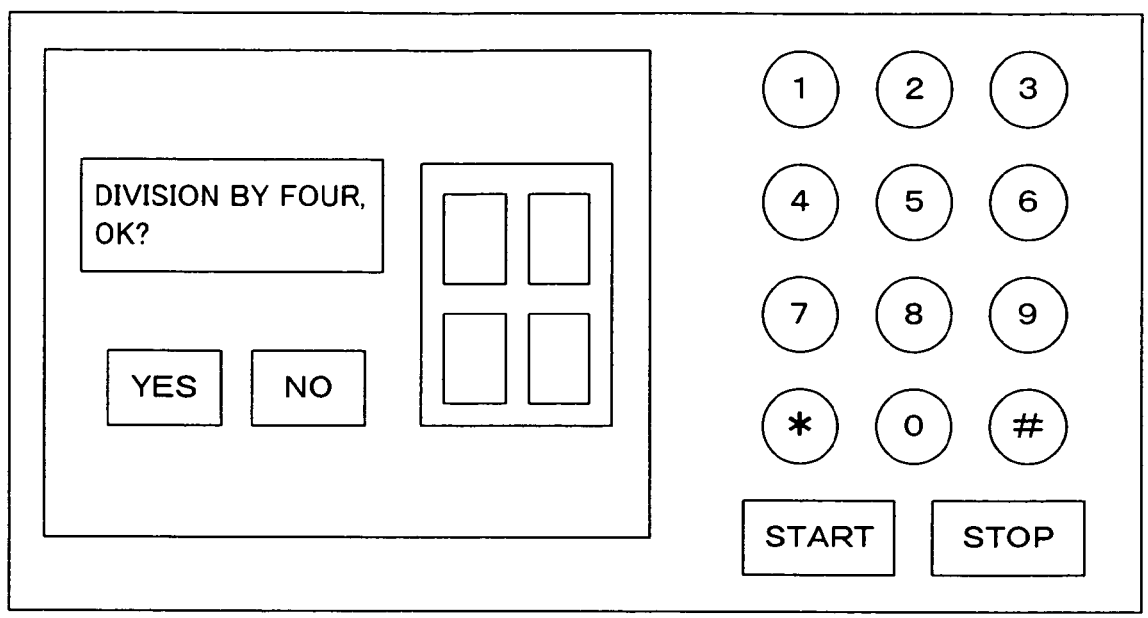
FIG. 23 is a schematic illustration of a display image for confirming the space assignment in the eighth embodiment of the invention.

FIG. 22 is a flowchart of the operation of the eighth embodiment of image processing apparatus. After determining the positions for dividing the input image (S530), the user confirms the space assignment in order to make sure if the positions for dividing the input image are correct or not (S535). The user can make sure if the number of the images to be produced by the division and the dividing positions are correct or not when the images are displayed with a reduced size in a touch panel on the control panel of a multi-function peripheral (MFP) as shown in FIG. 23. If the dividing positions are correct, the operation of the embodiment after counting the number of pages assigned to the original (S540) is the same as that of the second embodiment illustrated in FIG. 5. If the dividing positions are not correct, the embodiment determines that the image is not an image obtained by space assignment and continues the processing operation.

Thus, if this embodiment of the present invention incorrectly determines the positions for dividing the input image, it is possible to prevent wrong page images from being produced.

While this embodiment is described above in terms of adding a space assignment confirming section to the space assignment determining section of the functional blocks of the second embodiment, it is also possible to add a space assignment confirming section to the space assignment determining section of the functional blocks of any of the third embodiment through the seventh embodiment to provide similar effects.

Ninth Embodiment

This embodiment operates effectively when a number of document images have same image particulars.

Figure 24:
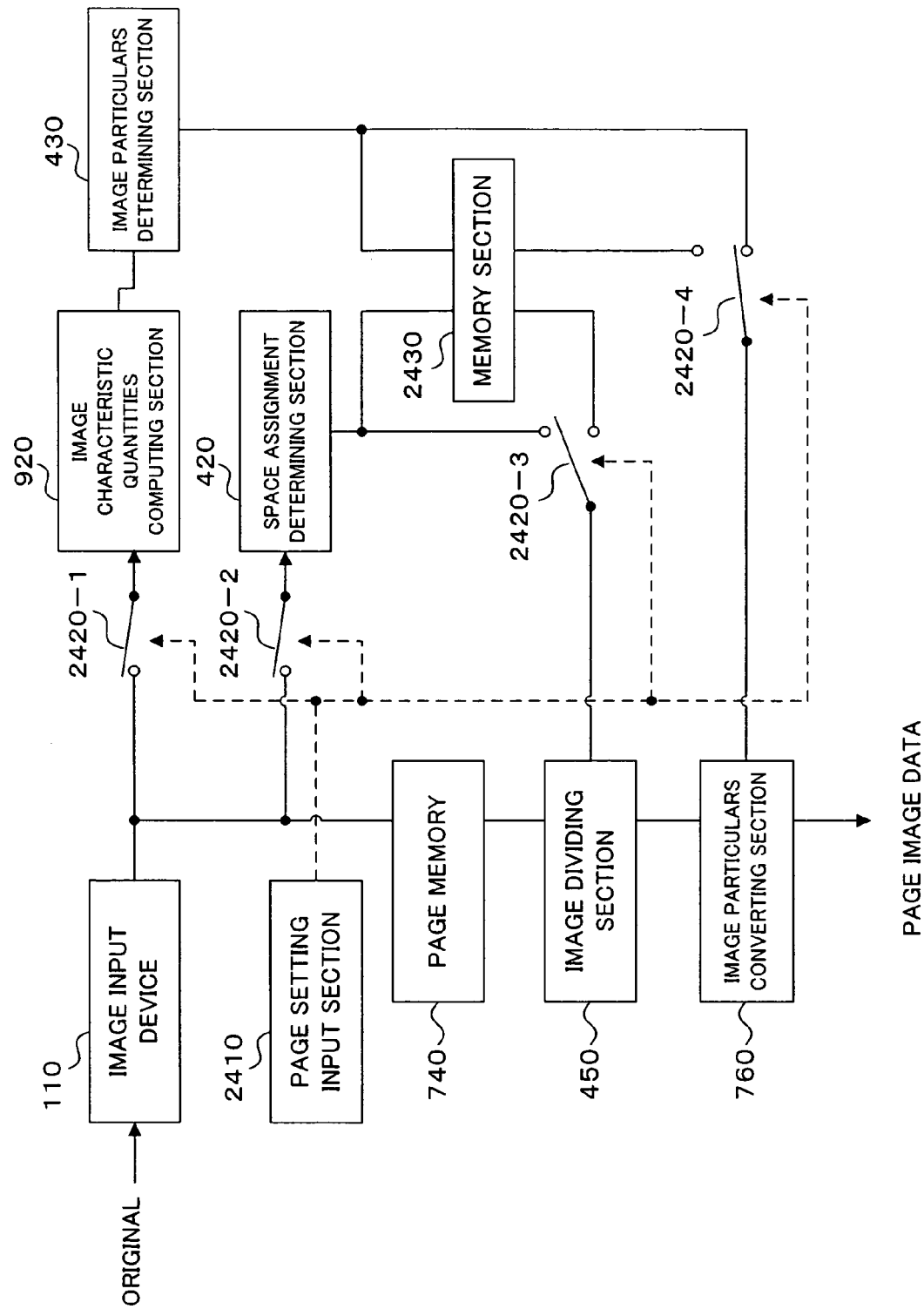
FIG. 24 is a schematic functional block diagram of the ninth embodiment of image processing apparatus according to the invention, illustrating the configuration thereof.

FIG. 24 is a schematic functional block diagram of the ninth embodiment of image processing apparatus according to the invention, which is obtained by modifying the fifth embodiment. By comparing FIG. 24 with FIG. 14 that schematically illustrates a functional block diagram of the fifth embodiment, it will be seen that this embodiment differs from the fifth embodiment in that this embodiment additionally comprises a page setting input section 2410, switches 2420-1 through 2420-4 and a memory section 2430. The page setting input section 2410 is provided for the user to select a setting of using the same image particulars for all the plurality of input document images and dividing all the plurality of input document images at the same positions or a setting of using different image particulars to the plurality of input document images and dividing the plurality of input document image at different positions. The page setting input section 2410 may be formed by the control panel or the controller (not shown) of the image input device 110.

For example, if the user knows that all the document images have same image particulars as in the case of bill forms, the user selects a setting of determining the image particulars and the positions for dividing the images by using only the first document image by the page setting input section 2410. In such a case, the embodiment executes the process of determining the image particulars of an image and the positions for dividing the image only once by using the first document image and it does not execute the process of determining the image particulars of an image and the positions for dividing the image for all the remaining document images starting from the second document image. Thus, the time for processing the second document image and all the succeeding document images is saved.

Firstly, assume here that the user selects a setting of using the same image particulars for all the plurality of input document images and dividing all the plurality of input document images at the same positions by means of the page setting input section 2410. When processing the first document image, the page setting input section 2410 sets the switches 2420-1 through 2420-4 as illustrated in FIG. 24. More specifically, the switches 2410-1 and 2410-2 are closed and the image input device 110 is connected to the image characteristic quantities computing section 920 and the space assignment determining section 420, while the switch 2410-3 is so set as to connect the image dividing section 450 to the space assignment determining section 420 and the switch 2410-4 is so set as to connect the image particulars converting section 760 to the image particulars determining section 430. Under this condition, the connection arrangement is same as that of the fifth embodiment as illustrated in FIG. 14 except the memory section 2430. Unlike the fifth embodiment, when the first document image is processed, the outcome of the space assignment determining operation of the space assignment determining section 420 and that of the image particulars determining operation of the image particulars determining section 430 are also input to the memory section 2430 and stored in it.

When processing the second and succeeding document images, the page setting input section 2410 of this embodiment turns the switches 2420-1 through 2420-4 respectively to the opposite sides from the sides illustrated in FIG. 24. More specifically, the switches 2410-1 and 2410-2 are opened and the image characteristic quantities computing section 920 and the space assignment determining section 420 are disconnected from the image input device 110. Therefore, the operation of computing the image characteristic quantities and that of determining the space assignment are not conducted for processing the second and succeeding document images. Additionally, the page setting input section 2410 of this embodiment sets the switch 2410-3 so as to connect the image dividing section 450 to the memory section 2430 and switch 2410-4 so as to connect the image particulars converting section 760 to the memory section 2430. Thus, the image dividing section 450 and the image particulars converting section 760 respectively execute an image dividing process and an image particulars converting process on the second and succeeding document images according to the outcome of the space assignment determining operation and that of image particulars determining operation that are stored in the memory section 2430 at the time of processing the first document image.

Now, assume here that the user selects a setting of using different image particulars to the plurality of input document images and dividing the plurality of input document image at different positions by means of the page setting input section 2410. Then, the page setting input section 2410 maintains the conditions of the switches 2420-1 through 2420-4 as illustrated in FIG. 24 so that this embodiment of image processing apparatus executes a process same as that of the fifth embodiment for each input document image.

While this embodiment is described above in terms of adding a page setting input section and so on to the functional blocks of the fifth embodiment, it is also possible to add a page setting input section, switches and a memory section for storing the outcome of the space assignment determining operation and that of the image particulars determining operation to the functional blocks of any of the third embodiment and the fifth through the seventh embodiment to provide similar effects.

As an alternative arrangement, in the functional block diagram of the second embodiment illustrated in FIG. 4, a switch is arranged on the signal path from the space assignment determining section 420 to the image dividing section 450 while another switch is arranged on the signal path from the image particulars determining section 430 to the input mode selecting section 440 and the switches are controlled by a page setting input section. Then, the switches are closed to make the alternative embodiment operate just like the second embodiment illustrated in FIG. 4 when reading the first document image and the outcome of the space assignment determining operation performed by the space assignment determining section 420 and that of the image particulars determining operation performed by the image particulars determining section 430 are stored in the memory section. The above switches are opened when reading the next document image and the outcome of the space assignment determining operation and that of the image particulars determining operation stored in the memory section are input respectively to the input mode selecting section 440 and the image dividing section 450.

A page setting input section, switches and a memory section for storing the outcome of the space assignment determining operation and that of the image particulars determining operation may also be added to the functional blocks of the fourth embodiment illustrated in FIG. 9.

Tenth Embodiment

This embodiment is effective for acquiring only the data of the page or pages that the user wants.

Figure 25:
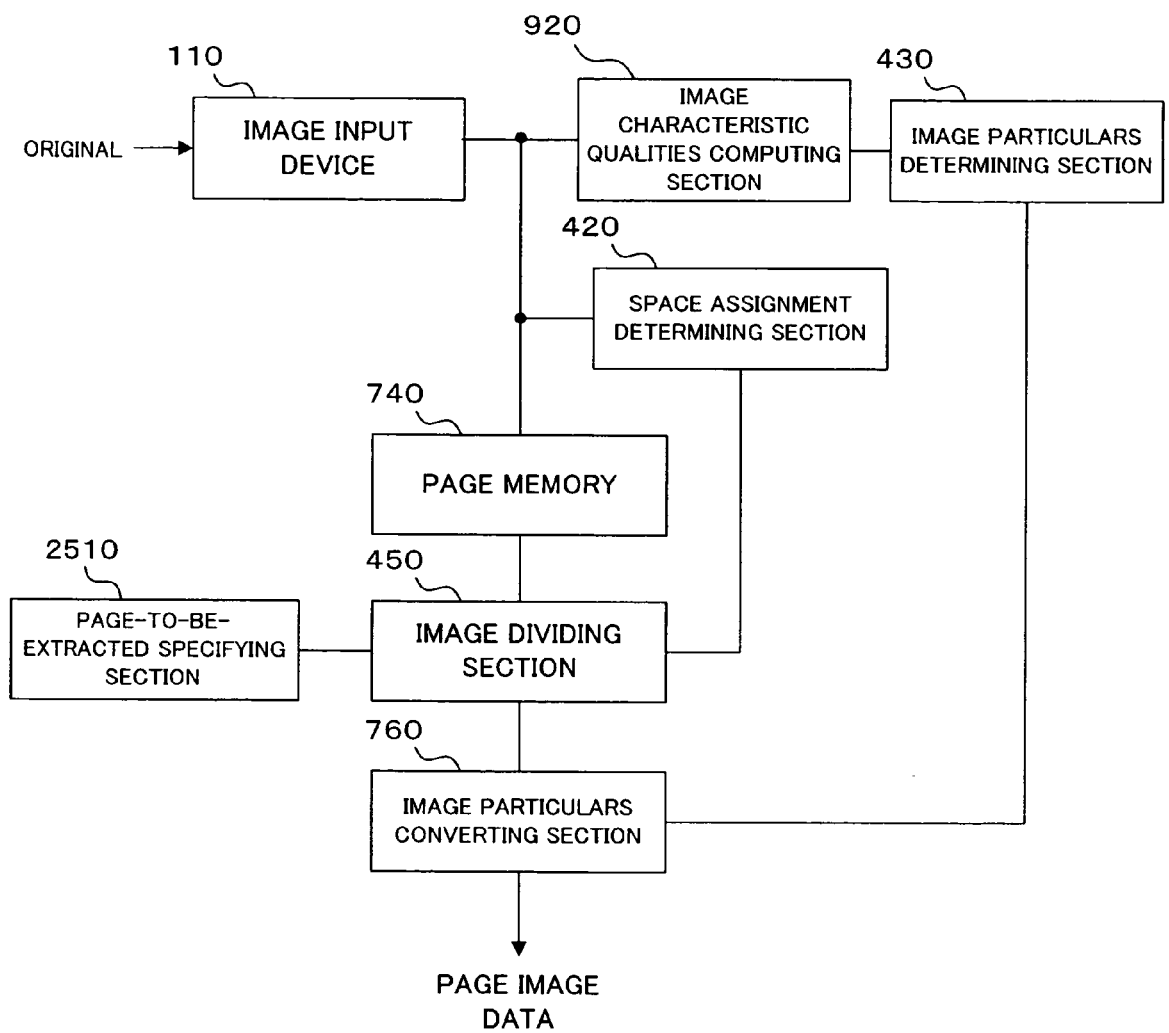
FIG. 25 is a schematic functional block diagram of the tenth embodiment of image processing apparatus according to the invention, illustrating the configuration thereof.

FIG. 25 is a schematic functional block diagram of the tenth embodiment of image processing apparatus according to the invention, which is obtained by modifying the fifth embodiment. By comparing FIG. 25 with FIG. 14 that schematically illustrates a functional block diagram of the fifth embodiment, it will be seen that this embodiment differs from the fifth embodiment in that a page-to-be-extracted specifying section 2510 is added and connected to the image dividing section 450. The page-to-be-extracted specifying section 2510 is used when the user wants to divide an input image into page images and extract only the page image or page images he or she wants. The page-to-be-extracted specifying section 2510 may be formed by the control panel or the controller (not shown) of the image input device.

The page image or images to be extracted can be specified by the user by directly specifying them by means of the touch panel, by executing an OCR process on the input document image and subsequently retrieving them by means of a keyword by conducting template matching on the input document image and subsequently performing retrieval by means of a key image or by inputting layout information as key and extracting page images having respective layout structures that resembles each other.

While this embodiment is described above in terms of adding a page-to-be-extracted specifying section to the functional blocks of the fifth embodiment, it is also possible to add a page-to-be-extracted specifying section to the image dividing section of the functional blocks of any of the second embodiment through the seventh embodiment to provide similar effects.

Eleventh Embodiment

Figure 26:
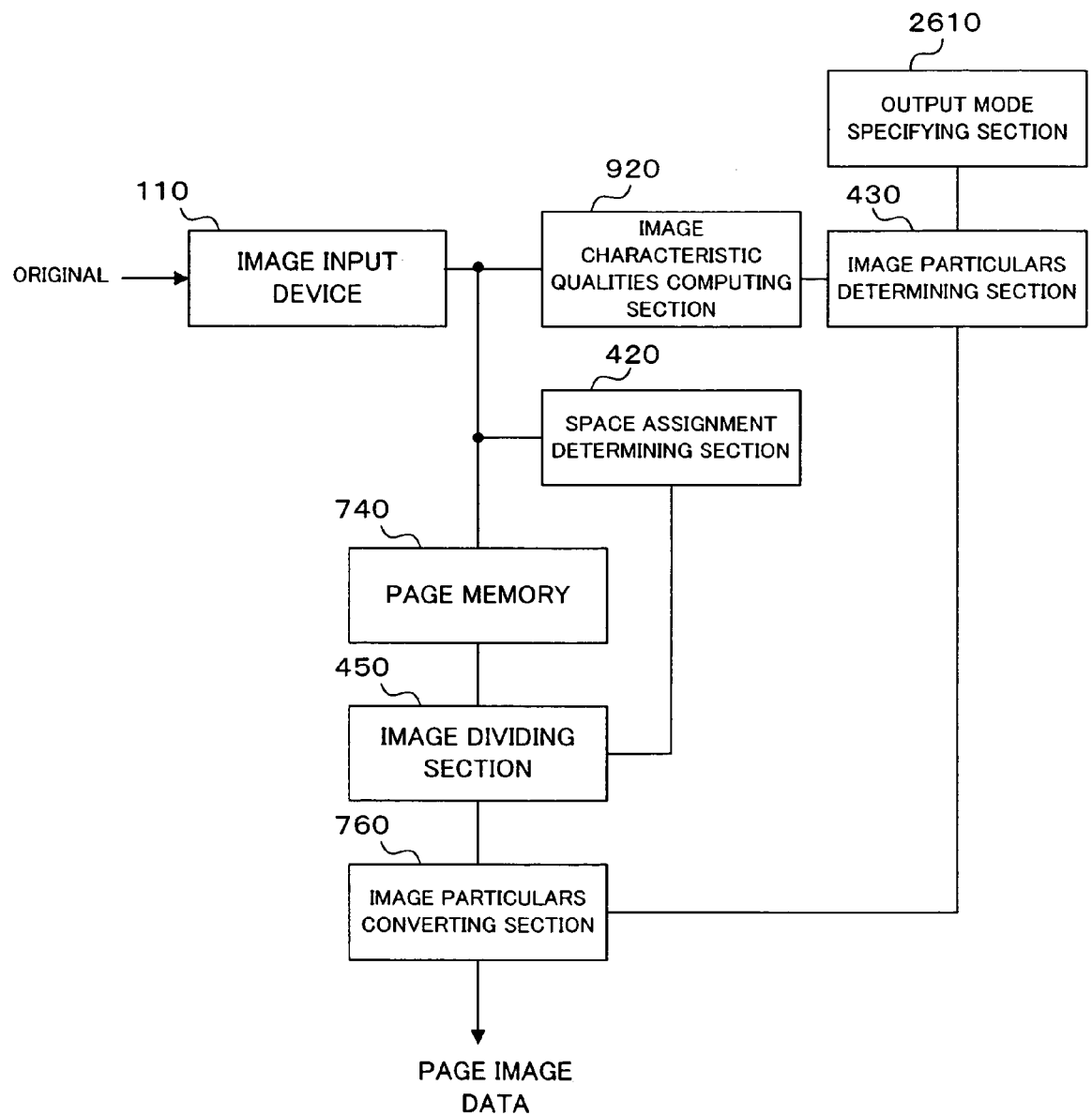
FIG. 26 is a schematic functional block diagram of the eleventh embodiment of image processing apparatus according to the invention, illustrating the configuration thereof.

FIG. 26 is a schematic functional block diagram of the eleventh embodiment of image processing apparatus according to the invention, which is obtained by modifying the fifth embodiment. By comparing FIG. 26 with FIG. 14 that schematically illustrates a functional block diagram of the fifth embodiment, it will be seen that this embodiment differs from the fifth embodiment in that an output mode specifying section 2610 is added in this embodiment. The output mode specifying section 2610 is provided to make the page image data output from the image processing apparatus to be adapted to various modes of utilization that the user wants to use. The output mode specifying section 2610 may be formed by the control panel or the controller (not shown) of the image input device 110.

Figure 27:
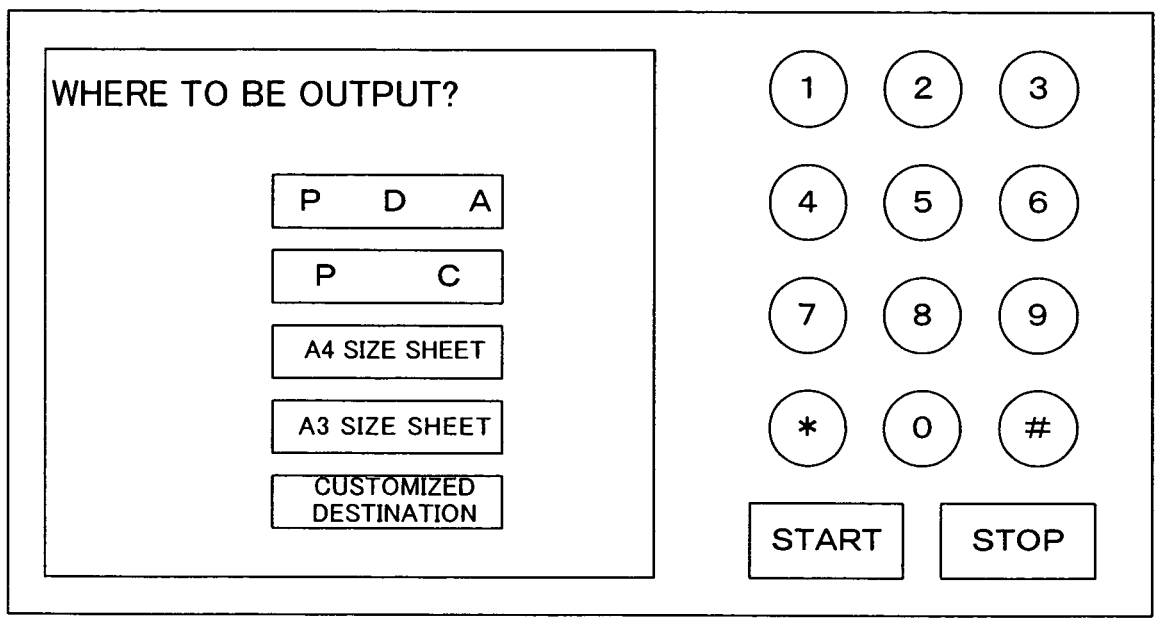
FIG. 27 is a schematic illustration of the images for specifying an output device, an output medium and so on in the first mode of operation of the eleventh embodiment of the invention.

FIG. 27 is a schematic illustration of the images for specifying an output device, an output medium and so on in the first mode of operation of this embodiment. In this mode of operation, the output mode specifying section 2610 is connected to the image particulars determining section 430 and the image particulars of the page images that are output from this embodiment are determined as specified by means of the output mode specifying section. In the instance of FIG. 27, PDA and PC are provided as output devices and A4 size sheets and A3 size sheets are provided as output mediums, while a customized destination of output is also provided. Output resolutions that match each of the output devices are provided as default value as shown in FIG. 28. Similarly, output resolutions that match each of the output mediums are provided as default values. In FIG. 28, Table 28A shows the default values that are used when a PDA is specified as output device and Table 28B shows the default values that are used when a PC is specified as output device, whereas Table 28C shows the default values that are used when A4 size sheets are specified as output medium and Table 28D shows the default values that are used when A3 size sheets are specified as output medium.

When the customized destination is selected, the user can input a desired numerical value for resolution. While FIG. 28 shows 600 dpi as maximum value for resolution, note that it is shown only on an assumption that the maximum resolution of the image input device is 600 dpi.

In the second mode of operation of this embodiment, the user can select and determine, for example, either a high speed mode or a high image quality mode as output mode by means of the output mode specifying section 2610 for by turn determining the image particulars of each page image. In this embodiment, the output mode specifying section 2610 is connected to the image particulars determining section 430 as illustrated in FIG. 26. Thus, the image particulars of each of the page images to be output from this embodiment are determined as specified by means of the output mode specifying section 2610. FIG. 29 is a schematic illustration of the image particulars determined by the image particulars determining section for each mode that can be specified in this embodiment, as shown in Table 29A through Table 29F. It will be seen from Table 29A through Table 29C that monochrome and low resolution are selected respectively for color mode and resolution and a color depth that is apt to become equal to 1 bit is selected in a high speed operation mode in order to reduce the quantity of data for each page image as much as possible. On the other hand, Table 29D through Table 29F show that color and high resolution are selected respectively for color mode and resolution and a color depth that is apt to become equal to 8 bits is selected in a high image quality mode in order not to reduce the quantity of information for each page image. Other modes may be provided as output modes from the viewpoint of application of the preserved file. Such modes may include an image viewing mode, a printing mode and an e-mail delivery mode.

Thus, with this embodiment, the user can acquire page images with image particulars that the user wants from an N in 1 original.

While this embodiment is described above in terms of adding an output mode specifying section to the functional blocks of the fifth embodiment, it is also possible to add an output mode specifying section to the image particulars determining section of the functional blocks of any of the second embodiment through the seventh embodiment to provide similar effects.

Twelfth Embodiment

Figure 30:
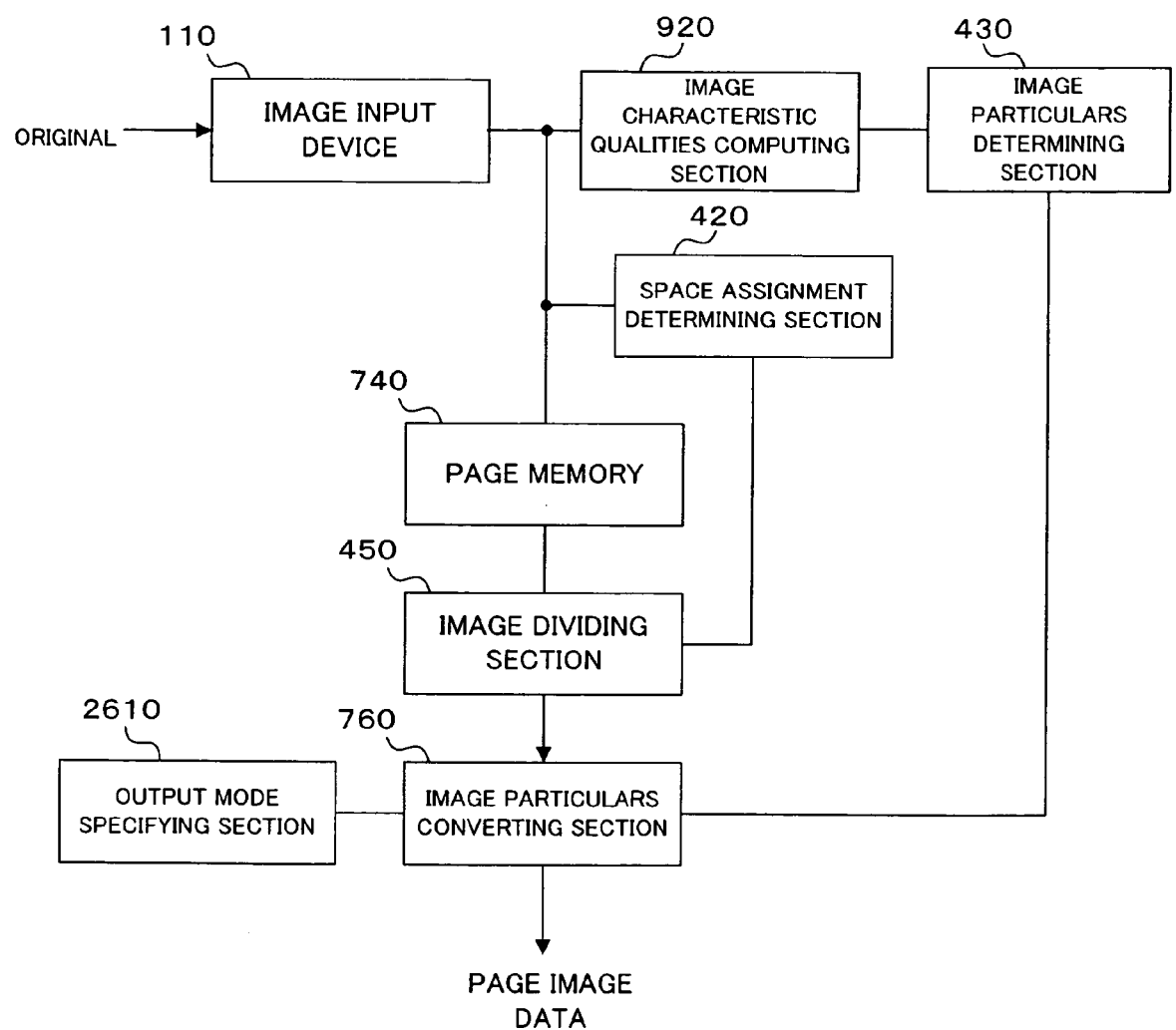
FIG. 30 is a schematic functional block diagram of the twelfth embodiment of image processing apparatus according to the invention, illustrating the configuration thereof.

The twelfth embodiment of the present invention is obtained by adding a functional feature by means of which the user can select if he or she executes an optional process that is not directly related to image quality or not. FIG. 30 is a schematic functional block diagram of the twelfth embodiment of image processing apparatus according to the invention, which is obtained by modifying the fifth embodiment. In this embodiment, the output mode specifying section 2610 is connected to the image particulars converting section 760. As in the case of the eleventh embodiment, the output mode specifying section 2610 may be formed by the control panel or the controller (not shown) of the image input device 110.

In an N in 1 image, each page image may be provided with a frame. Then, the user may want to erase the frame when the page image is output from the embodiment of image processing apparatus. In the first mode of operation of this embodiment, it is possible to erase the frame of any page image.

When the user selects the functional feature of erasing the frames of page images by means of the output mode specifying section 2610, the image particulars converting section 760 determines the positions of the lines of the frames from the density histograms of the input document image as shown in FIGS. 31A through 31D. Then, the pixels that are determined to be located at the positions of the lines of the frames are replaced by those of a color same as the background color of the document image to erase the frames.

When an input document image appears like the one illustrated in FIG. 31A and density histograms of the input document image are computationally obtained in a longitudinal direction and in a transversal direction, the density histograms shows peaks at the positions of the frames as illustrated in FIG. 31B. One of the peaks of each density histogram may be lower than the other depending on the contour of the frame. Then, it is judged that the frame is located at such positions.

Then, the background color of the document image is determined. A region having a sufficiently large width is extracted for each line of the frames in the regions that are determined as frames and histograms are computationally determined respectively for the R (red) signal, the G (green) signal and the B (blue) signal in each of the regions (FIG. 31C). The color $(r_0, g_0, b_0)$ that corresponds to the peaks of the obtained histograms is determined to be the background color. On the basis of the outcome of the above described process, it is possible to erase the frames by replacing the color of the pixels at the positions judged to be as those of the frames with the color that is determined as the background color of the document image. After erasing the frames in this way, page images as shown in FIG. 31D are prepared.

It may be necessary to put page numbers to the page images output from this embodiment of image processing apparatus. In the second mode of operation of this embodiment, it is possible to put a page number on each of the output page images.

Figure 32A:
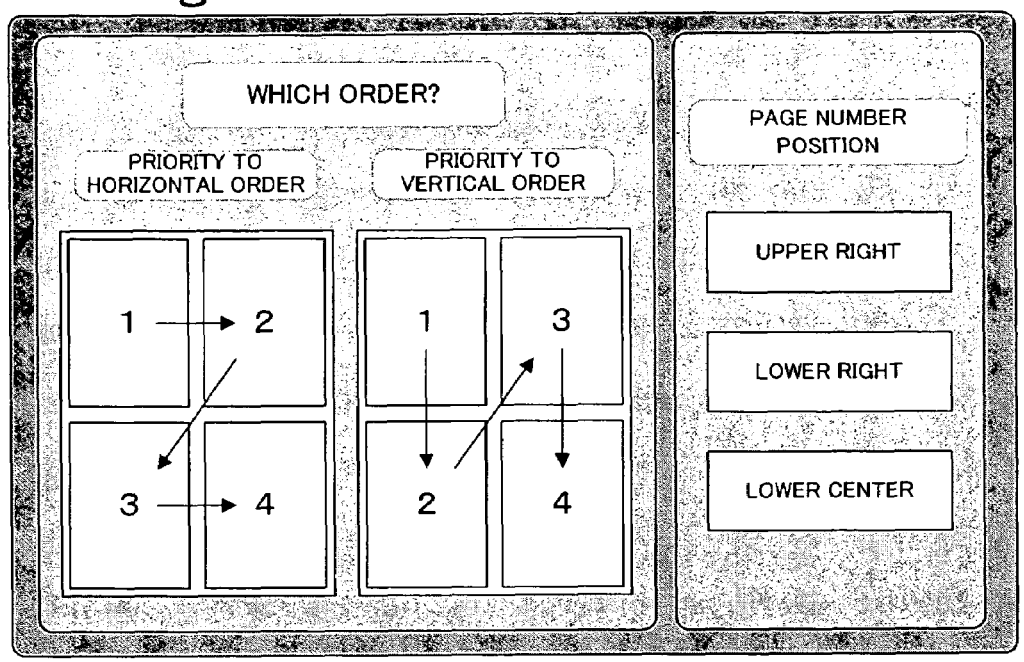
FIG. 32A is a schematic illustration of a display screen image prompting the user to input the page numbers and the position for printing a page number on each page on the output page images in the second mode of operation of the twelfth embodiment of the invention.
Figure 32B:
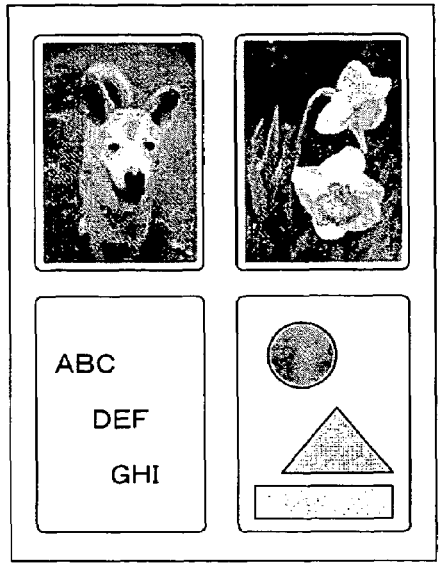
FIG. 32B is a schematic illustration of an image that may be input to the twelfth embodiment of image processing apparatus of the invention as input document image.
Figure 32C:
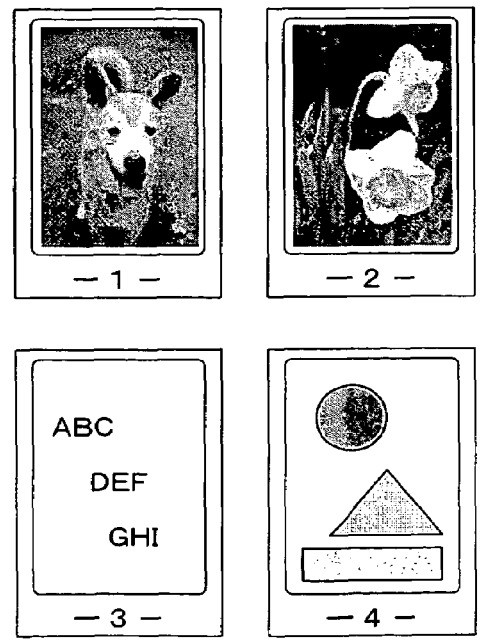
FIG. 32C is a schematic illustration of an output image that is similar to that of FIG. 32B but page numbers are printed at the predetermined position on each page image.

When the user selects the functional feature of putting a page number on each page image by means of the output mode specifying section 2610, the user specifies the order of the page images in which page numbers are printed and the position where a page number is printed on the N in 1 image being displayed on the control panel as shown in FIG. 32A. In response to this operation by the user, the image particulars converting section 760 adds page numbers respectively at the predetermined positions on the page images of the input document image as shown in FIG. 32B. Note that the image particulars converting section 760 also executes a process of converting the image particulars to those determined by the image particulars determining section 430. As a result of these processes, page images respectively carrying page numbers at predetermined positions as shown in FIG. 32C are produced from the input document image as shown in FIG. 32B. FIG. 32C shows page images that are output when the user gives priority to horizontal order and selects lower center for the page number position in the image of FIG. 32A.

Thus, with this embodiment, the user can acquire page images with image particulars that the user wants from an N in 1 original.

While this embodiment is described above in terms of adding an output mode specifying section to the functional blocks of the fifth embodiment, it is also possible to add an output mode specifying section to the image particulars converting section of the functional blocks of any of the third embodiment and the fifth through the seventh embodiments to provide similar effects.

An image editing section having a functional feature of erasing a frame and adding a page number may be arranged downstream relative to the image dividing section and the operation of the image editing section may be specified by means of the output mode specifying section connected to the image editing section so as to erase the frame of each component image or to add a page number of each of the component images in the second embodiment and the fourth embodiment.

It may be clear from the above description of the embodiments of the present invention, according to the present invention, it is possible to provide an image processing apparatus and an image processing method that can produce component images as objects of easy viewing and, at the same time, of a small data size from a document image by dividing the document image. Similarly, according to the present invention, it is possible to provide an image processing apparatus and an image processing method that can produce component images as objects of easy viewing and, at the same time, with a small size, or a data size from a document image that is prepared by space assignment by dividing the document image.

Although exemplary embodiments of the present invention have been shown and described, it will be apparent to those having ordinary skill in the art that a number of changes, modifications or alterations to the invention as described herein may be made, none of which depart from the spirit of the present invention. All such changes, modifications and alterations should therefore be seen as within the scope of the present invention.

What is claimed is:

1. An image processing apparatus comprising:
an image input device configured to input information of a document image;
an image analyzing device configured to analyze the image particulars of the input document image obtained by the image input device or component images contained in the input document image;
an image dividing device configured to divide the input document image into the component images according to the outcome of the analysis by the image analyzing device;
an image particulars determining device configured to determine the image particulars of the image or each of the images analyzed by the image analyzing device according to the outcome of analysis of the image analyzing device;
an image particulars converting device configured to convert the image particulars obtained by the analysis by the image analyzing device to the image particulars determined by the image particulars determining device; and
a device configured to output the information of the component images having the image particulars converted by the image particulars converting device.

2. The apparatus according to claim 1, wherein the image analyzing device includes:
an image region analyzing section configured to analyze the input document image or image regions included in the input document image for type and position;
an image characteristic quantities computing section configured to analyze the characteristic quantities of the input document image or the component images included in the input document image including the total area of character regions, the minimum value of character size, the number of color pixels and the total area of the original or the total number of pixels of the original; or
a space assignment determining section which determines if the input document image is produced by assigning a plurality of pages or not and, upon determining that the input document image is produced by assigning a plurality of pages, then determines the image dividing positions and the number of the assigned pages.

3. The apparatus according to claim 1, wherein
the image particulars determining device determines the image particulars including the resolution, the type that is either color or monochrome, the color depth and the image data compression system of the image.

4. The apparatus according to claim 1, wherein
the image analyzing device analyzes the type and the position of each of the image regions that are component images included in the input document image,
the image particulars determining device determines the image particulars of each of the image regions including the resolution, the type that is either color or monochrome, the color depth and the image data compression system, and
the image particulars converting device converts the image particulars of each of the image regions to the image particulars determined by the image particulars determining device.

5. The apparatus according to claim 1, wherein
the image analyzing device determines if the input document image is produced by assigning a plurality of page images that are the component images or not and, upon determining that the input document image is produced by assigning a plurality of pages, then the image analyzing device determines the image dividing positions and the number of the assigned pages, the image particulars determining device determines the resolution of the input document image as image particular according to the outcome of the analysis by the image analyzing device, and the image particulars converting device converts the image particulars to the resolution as determined by the image particulars determining device.

6. The apparatus according to claim 5, further comprising:

a page setting input device configured to receive setting information indicating if same image particulars and same image dividing positions are to be used for a group of document images or not, and a memory device configured to store the outcome of determination of image particulars by the image particulars determining device and the outcome of determination of space assignment by the space assignment determining device, wherein, when setting information indicating that same image particulars and same image dividing positions are to be used for the group of document images is input from the page setting input device, the outcome of determination of image particulars by the image particulars determining device and the outcome of determination of space assignment by the space assignment determining section are stored in the memory device for one of the group of document images and the image particulars are converted by the image particulars converting device for the remaining document images of the group of document images according to the outcome of determination of image particulars by the image particulars determining device as stored in the memory device while each of the document images is divided by the image dividing device according to the outcome of determination of space assignment by the space assignment determining section as stored in the memory device.

7. The apparatus according to claim 5, further comprising:

an output mode specifying device connected to the image particulars converting device to receive output mode specifying information as input, and the image particulars converting device further having a functional feature of erasing the frame of each of the page image or adding a page number to each of the page images according to the output mode specifying information input to the output mode specifying device.

8. The apparatus according to claim 1, wherein the image analyzing device determines if the input document image is produced by assigning a plurality of page images that are the component images or not and, upon determining that the input document image is produced by assigning a plurality of pages, then the image analyzing device determines the image dividing positions and the number of the assigned pages, and also analyzes the image characteristic quantities of the input document image including the total area of character regions, the minimum value of character size, the number of color pixels, the total area of the original and the total number of pixels of the original, the image particulars determining device determines the image particulars of the input document image including the resolution, the number of colors and the color depth by using the image characteristic quantities output from the image analyzing device, and the image particulars converting device converts the image particulars of each of the page images to the image particulars determined by the image particulars determining device.

9. The apparatus according to claim 1, wherein the image analyzing device determines if the input document image is produced by assigning a plurality of page images that are the component images or not and, upon determining that the input document image is produced by assigning a plurality of pages, then the image analyzing device determines the image dividing positions and the number of the assigned pages, and also analyzes the image characteristic quantities of each of the page images obtained by dividing the input document image by the image dividing device including the total area of character regions, the minimum value of character size, the number of color pixels, the total area of each of the page images and the total number of pixels of each of the page images according to the outcome of the determination, the image particulars determining device determines the image particulars of each of the page images including the resolution, the number of colors and the color depth according to the image characteristic quantities output from the image particulars determining device or the image analyzing device, and the image particulars converting device converts the image particulars of each of the page images to the image particulars determined by the image particulars determining device.

10. The apparatus according to claim 1, wherein the image analyzing device determines if the input document image is produced by assigning a plurality of page images that are the component images or not and, upon determining that the input document image is produced by assigning a plurality of pages, then the image analyzing device determines the image dividing positions and the number of the assigned pages and also analyzes the type and position of each of the image regions in each of the page images, the image particulars determining device determines the image particulars of each of the image regions in each of the page images including the resolution, the type that is either color or monochrome and the color depth or the image data compression system according to the outcome of the analysis of the image regions by the image analyzing device, and the image particulars converting device converts the image particulars of each of the page images to the image particulars determined by the image particulars determining device.

11. An image processing apparatus comprising:

an original reading device configured to read information of a document image;

an image analyzing device configured to analyze the image particulars of the input document image acquired for the first time by the original reading device;

an image particulars determining device configured to determine the image particulars of the input document image according to the outcome of analysis of the image analyzing device;

an input mode selecting device configured to select an input mode for the original reading device according to the image particulars determined by the image particulars determining device;

an image dividing device configured to divide the input document image into page images according to the outcome of the analysis made by the image analyzing device of the document image acquired for the second time by the original reading device in the input mode selected by the input selecting device; and a device configured to output the information of the page images produced by the image dividing device.

12. The apparatus according to claim 11, wherein the image analyzing device includes:

an image characteristic quantities computing section configured to analyze the characteristic quantities of the input document image including the total area of character regions, the minimum value of character size, the number of color pixels and the total area of the original or the total number of pixels of the original, or a space assignment determining section which determines if the input document image is produced by assigning a plurality of pages or not and, upon determining that the input document image is produced by assigning a plurality of pages, then determines the image dividing positions and the number of the assigned pages.

13. The apparatus according to claim 11, wherein the image particulars determining device determines the resolution, the number of colors or the color depth of the image.

14. The apparatus according to claim 11, wherein the image analyzing device determines if the input document image is produced by assigning a plurality of pages or not and, upon determining that the input document image is produced by assigning a plurality of pages, then the image analyzing device determines the image dividing positions and the number of the assigned pages, and the image particulars determining device determines the resolution as a function of the number of the assigned pages of the input document image as determined by the image analyzing device as image particular.

15. The apparatus according to claim 14, further comprising:

a space assignment confirming device connected to the space assignment determining section to confirm the image dividing positions as determined by the space assignment determining section.

16. The apparatus according to claim 14, further comprising:

a page-to-be-extracted specifying device connected to the image dividing device to receive information specifying the page to be extracted as input, the image dividing device being adapted to divide the image and output the page images obtained by the division according to the information input to the page-to-be-extracted specifying device to specify the page to be extracted.

17. The apparatus according to claim 14, further comprising:

an output mode specifying device connected to the image particulars determining device to select the output device or the output medium that utilizes the component images included in the input document image as a customized destination and receives information for specifying either a high speed mode or a high image quality mode as output mode, the image particulars determining device being adapted to determine image particulars according to the information for specifying the output mode as input to the output specifying device.

18. The apparatus according to claim 11, wherein the image analyzing device determines if the input document image is produced by assigning a plurality of pages or not and, upon determining that the input document image is produced by assigning a plurality of pages, then the image analyzing device determines the image dividing positions and the number of the assigned pages, and also analyzes the characteristic quantities of the input document image including the total area of character regions, the minimum value of character size, the number of color pixels and the total area of the original or the total number of pixels of the original, and the image particulars determining device determines the resolution, the number of colors or the color depth of the input document image as image particular according to the characteristic quantities analyzed by the image analyzing device.

19. An image processing method comprising:
using a computer to perform the steps of:
inputting information of a document image;
analyzing the image particulars of the obtained input document image or those of each of the component images contained in the input document image;
dividing the input document image into the component images according to the outcome of the analysis;
determining the image particulars of the image or each of the images according to the outcome of analysis of the image particulars;
converting the image particulars obtained by the analysis of the image to the determined image particulars; and
outputting the information of the component images having the image particulars converted according to the outcome of the determination.

20. An image processing method comprising:
using a computer to perform the steps of:
reading information of an original document image;
analyzing the image particulars of the input document image acquired for the first time by the reading;
determining the image particulars of the input document image according to the outcome of analysis;
selecting an input mode for reading the information of the original document according to the determined image particulars;
dividing the input document image into page images according to the outcome of the analysis of the information of the input document image acquired for the second time as read in the selected input mode; and
outputting the information of the page images acquired as a result of the above.

* * * * *